(12) United States Patent
Puniello et al.

(10) Patent No.: US 7,261,535 B2
(45) Date of Patent: Aug. 28, 2007

(54) CO-INJECTION NOZZLE

(75) Inventors: Paul A. Puniello, Bristol, RI (US);
Christopher Cavallaro, Lakeville, MA (US); Christopher T. Grace, Rochester, NY (US); David J. Crandall, Ontario, NY (US); Douglas C. Hepler, Rochester, NY (US)

(73) Assignee: Acushnet Company, Fairhaven, MA (US)

( * ) Notice: Subject to any disclaimer, the term of this patent is extended or adjusted under 35 U.S.C. 154(b) by 356 days.

(21) Appl. No.: 10/748,210

(22) Filed: Dec. 31, 2003

(65) Prior Publication Data

US 2005/0140061 A1 Jun. 30, 2005

(51) Int. Cl.
*B29C 45/16* (2006.01)
*B29C 45/20* (2006.01)

(52) U.S. Cl. .................. 425/130; 425/133.1; 425/191; 425/462

(58) Field of Classification Search ................ 425/130, 425/133.1, 191, 462
See application file for complete search history.

(56) References Cited

U.S. PATENT DOCUMENTS

| | | |
|---|---|---|
| 2,418,856 A | 4/1947 | Stacy |
| 2,809,954 A | 10/1957 | Kazenas |
| 2,851,424 A | 9/1958 | Switzer |
| 2,938,873 A | 5/1960 | Kazenas |
| 3,253,146 A | 5/1966 | De Vries |
| 3,339,240 A | 9/1967 | Corbett |
| 3,412,036 A | 11/1968 | McIntosh |
| 3,976,226 A | 8/1976 | Monnet |
| 3,989,568 A | 11/1976 | Isaac |
| 4,052,497 A | 10/1977 | Monnet |
| 4,123,061 A | 10/1978 | Dusbiber |
| 4,128,600 A | 12/1978 | Skinner et al. |
| 4,342,793 A | 8/1982 | Skinner et al. |
| 4,431,193 A | 2/1984 | Nesbitt |
| 4,625,964 A | 12/1986 | Yamada |
| 4,670,199 A | 6/1987 | Montet et al. |
| 4,798,386 A | 1/1989 | Berard |
| 4,848,770 A | 7/1989 | Shama |
| 4,919,434 A | 4/1990 | Saito |
| 4,921,759 A | 5/1990 | Orain et al. |
| 4,944,909 A | 7/1990 | Eckardt et al. |
| 4,950,696 A | 8/1990 | Palazzotto et al. |
| 4,985,340 A | 1/1991 | Palazzotto et al. |
| 4,998,734 A | 3/1991 | Meyer |
| 5,002,281 A | 3/1991 | Nakahara et al. |

(Continued)

FOREIGN PATENT DOCUMENTS

DE 4041799 7/1992

(Continued)

OTHER PUBLICATIONS

U.S. Appl. No. 10/384,414 filed on Sep. 9, 2004 to Morgan.

*Primary Examiner*—Robert Davis
*Assistant Examiner*—Joseph Leyson
(74) *Attorney, Agent, or Firm*—Bingham McCutchen LLP

(57) ABSTRACT

A nozzle for an injection molding machine is disclosed. The nozzle includes a nozzle body, an inner nozzle, and an outer nozzle. The nozzle defines two independent flow paths therethrough. The nozzle can simultaneously discharge two materials. A method of using the nozzle and a resulting golf ball product are also disclosed.

18 Claims, 9 Drawing Sheets

U.S. PATENT DOCUMENTS

| | | |
|---|---|---|
| 5,072,944 A | 12/1991 | Nakahara et al. |
| 5,094,603 A * | 3/1992 | Gellert ................ 425/130 |
| 5,131,830 A | 7/1992 | Orimoto et al. |
| 5,147,900 A | 9/1992 | Palazzotto et al. |
| 5,253,871 A | 10/1993 | Viollaz |
| 5,256,170 A | 10/1993 | Harmer et al. |
| 5,314,187 A | 5/1994 | Proudfit |
| 5,326,621 A | 7/1994 | Palazzotto et al. |
| 5,334,673 A | 8/1994 | Wu |
| 5,360,462 A | 11/1994 | Harmer et al. |
| 5,376,428 A | 12/1994 | Palazzotto et al. |
| 5,427,378 A | 6/1995 | Murphy |
| 5,442,680 A | 8/1995 | Schellinger et al. |
| 5,484,870 A | 1/1996 | Wu |
| 5,494,291 A | 2/1996 | Kennedy |
| 5,605,761 A | 2/1997 | Burns et al. |
| 5,672,643 A | 9/1997 | Burns et al. |
| 5,674,622 A | 10/1997 | Burns et al. |
| 5,692,974 A | 12/1997 | Wu et al. |
| 5,783,293 A | 7/1998 | Lammi |
| 5,823,890 A | 10/1998 | Maruko et al. |
| 5,840,788 A | 11/1998 | Lutz et al. |
| 5,891,381 A * | 4/1999 | Bemis et al. ................ 425/130 |
| 5,935,615 A * | 8/1999 | Gellert et al. ................ 425/130 |
| 5,935,616 A * | 8/1999 | Gellert et al. ................ 425/130 |
| 5,989,135 A | 11/1999 | Welch |
| 6,030,198 A * | 2/2000 | Babin .................. 425/130 |
| 6,135,751 A * | 10/2000 | Gellert et al. ................ 425/130 |
| 6,235,230 B1 | 5/2001 | Puniello |
| 6,274,075 B1 * | 8/2001 | Gellert et al. ................ 425/130 |
| 6,350,401 B1 * | 2/2002 | Gellert et al. ................ 425/130 |
| 6,544,459 B2 * | 4/2003 | Maruyama et al. ......... 425/130 |
| 6,648,776 B1 | 11/2003 | Boehm et al. |
| 2003/0030179 A1 * | 2/2003 | Kajikawa et al. ............ 425/130 |

FOREIGN PATENT DOCUMENTS

| | | |
|---|---|---|
| GB | 2278609 | 12/1994 |
| GB | 2291812 | 2/1996 |
| GB | 2291817 | 2/1996 |

* cited by examiner

CO-INJECTION NOZZLE

BACKGROUND OF THE INVENTION

1. Field of the Invention

The present invention relates generally to golf balls, and more specifically, to a method of making a golf ball with a multi-layer cover. In particular, the present invention relates to a method of making a golf ball having a cover with three layers comprised of at least two different materials.

2. Description of the Related Art

Conventional golf balls typically include at least a core and a cover, and can be divided into three general types or groups: (1) two piece balls, (2) wound balls (also know as three piece balls), and (3) multilayer balls. The difference in play characteristics resulting from these different types of constructions can be quite significant.

Balls having a two piece construction are generally most popular with the recreational golfer because they provide a very durable ball while also providing maximum distance. Two piece balls are made with a single solid core, usually formed of a crosslinked rubber, which is encased by a cover material. Typically, the solid core is made of polybutadiene that is chemically crosslinked with zinc diacrylate and/or similar crosslinking agents. The cover comprises tough, cut-proof blends of one or more materials known as ionomers such as SURLYNs®, which are resins sold commercially by E.I. DuPont de Nemours and Co. of Wilmington, Del. and IOTEK® from Exxon Corporation of Houston, Tex.

The combination of the above-described core and cover materials provides a "hard" covered ball that is resistant to cutting and other damage caused by striking the ball with a golf club. Further, such a combination imparts a high initial velocity to the ball which results in increased distance. Due to their hardness however, these balls have a relatively low spin rate, which makes them difficult to control, particularly on shorter approach shots. Thus, these types of balls are generally considered to be "distance" balls. Because these materials are very rigid, many two piece balls have a hard "feel" when struck with a club. Softer cover materials such as balata and softer ionomers in some instances, have been employed in two piece construction balls in order to provide improved "feel" and increased spin rates.

Wound balls typically have either a solid rubber- or liquid-filled center around which many yards of a stretched elastic thread or yarn are wound to form a core. The wound core is then covered with a durable cover material, such as a SURLYN® or similar material or a softer cover such as balata or polyurethane. Wound balls are generally softer than two piece balls and provide more spin, which enables a skilled golfer to have more control over the ball's flight and final position. In particular, it is desirable that a golfer be able to impart back spin to a golf ball for purposes of controlling its flight and controlling the action of the ball upon landing on the ground. For example, substantial back spin will make the ball stop once it strikes the landing surface instead of bounding forward. The ability to impart back spin onto a golf ball is related to the extent to which the golf ball cover deforms when it is struck with a golf club. Because wound balls are traditionally more deformable than conventional two piece balls, it is easier to impart spin to wound balls. However, wound higher spinning balls typically travel a shorter distance when struck as compared to a two piece ball. Moreover, as a result of their more complex structure, wound balls generally require a longer time to manufacture and are more expensive to produce than a two piece ball.

The United States Golf Association (USGA) has instituted a rule that prohibits the competitive use in any USGA sanctioned event of a golf ball that can achieve an initial velocity of greater than 76.2 meters per second (m/s), or 250 feet per second (ft/s), when struck by a driver with a velocity of 39.6 m/s, i.e., 30 ft/s (referred to hereinafter as "the USGA test"). However, an allowed tolerance of two percent permits manufacturers to produce golf balls that achieve an initial velocity of 77.7 m/s (255 ft/s).

Regardless of the form of the ball, players generally seek a golf ball that delivers maximum distance, which requires a high initial velocity upon impact. Therefore, in an effort to meet the demands of the marketplace, manufacturers strive to produce golf balls with initial velocities in the USGA test that approximate the USGA maximum of 77.7 m/s or 255 ft/s as closely as possible.

Therefore, golf ball manufacturers are continually searching for new ways in which to provide golf balls that deliver the maximum performance in terms of both distance and spin rate for golfers of all skill levels.

Typically, the golf ball cover layer is formed by one of two processes. The first process includes the compression molding of hemispheres. First, two hemispherical covers, called half shells, are injection molded. The hemispheres are then placed around a core and compression molded so that they fuse around the core and so that dimples are imparted into the cover. The cover is then finished to remove any visible molding lines or residue. The second process, called the retractable pin injection molding process, involves injection molding the cover directly around a core positioned on pins, retracting the pins once the cover material sufficiently surrounds the core, removing the covered core, and finishing it to form a completed golf ball. In both cover forming processes, the injection molding of the covers involves techniques known in the art. These techniques generally involve forcing melted material to substantially fill and take the shape of a mold, thereby forming a cover or hemisphere. When the material is cool enough to substantially maintain the shape of the mold, it is ejected from the mold, or demolded.

Typically, the cover material begins the injection molding process as resin pellets which are stored in a hopper. The pellets are gravity fed into a heated cylinder which melts the pellets as a screw pushes the softening pellets toward an accumulation zone. When enough melted material is accumulated to fill the mold, the screw is pushed or stroked forward, thereby forcing the melted material into the mold. Many prior art references are directed to mixing different materials to form new cover materials. This is traditionally accomplished by mixing pellets of different materials in the injection mold hopper.

Relatively recently, a number of golf ball manufacturers have introduced multilayer golf balls, i.e., having multiple core intermediate mantle and/or cover layers, in an effort to overcome some of the undesirable aspects of conventional two piece balls (such as their hard feel) while maintaining the positive attributes of these golf balls (including their increased initial velocity and distance). Further, it is desirable that such multilayer balls have a "click and feel" as well as spin characteristics approaching that of wound balls.

Manufacturers generally provide the golf ball with a durable cover material, such as an ionomer resin, or a softer cover material, such as polyurethane. Chemically, ionomer resins are a copolymer of an olefin and an α,β-ethylenically-unsaturated carboxylic acid having 10-90% of the carboxylic acid groups neutralized by a metal ion and are distinguished by the type of metal ion, the amount of acid, and the degree of neutralization. Commercially available ionomer resins include copolymers of ethylene and methacrylic or acrylic acid neutralized with metal salts. Examples include SURLYN® and IOTEK®.

Surrounding the core with an ionomeric cover material provides a ball that is virtually indestructible by golfers. The core/cover combination permits golfers to impart a high initial velocity to the ball that results in improved distance.

Polyurethanes are used in a wide variety of applications including adhesives, sealants, coatings, fibers, injection molding components, thermoplastic parts, elastomers, and both rigid and flexible foams. Polyurethane can be produced by the product of a reaction between a polyurethane prepolymer and a curing agent. The polyurethane prepolymer is generally a product formed by a reaction between a polyol and a diusocyanate. The curing agents used previously are typically diamines or glycols. A catalyst is often employed to promote the reaction between the curing agent and the polyurethane prepolymer.

Since about 1960, various companies have investigated the usefulness of polyurethane as a golf ball cover material. U.S. Pat. No. 4,123,061 teaches a golf ball made from a polyurethane prepolymer of polyether and a curing agent, such as a trifunctional polyol, a tetrafunctional polyol, or a fast-reacting diamine. U.S. Pat. No. 5,334,673 discloses the use of two categories of polyurethane available on the market, i.e., thermoset and thermoplastic polyurethanes, for forming golf ball covers and, in particular, thermoset polyurethane covered golf balls made from a composition of polyurethane prepolymer and a slow-reacting amine curing agent, and/or a difunctional glycol.

Additionally, U.S. Pat. No. 3,989,568 discloses a three-component system employing either one or two polyurethane prepolymers and one or two polyol or fast-reacting diamine curing agents. The reactants chosen for the system must have different rates of reactions within two or more competing reactions.

The color instability caused by both thermo-oxidative degradation and photodegradation typically results in a "yellowing" or "browning" of the polyurethane layer, an undesirable characteristic for urethane compositions are to be used in the covers of golf balls, which are generally white.

U.S. Pat. No. 5,692,974 discloses golf balls which have covers and cores and which incorporate urethane ionomers. The polyurethane golf ball cover has improved resiliency and initial velocity through the addition of an alkylating agent such as t-butyl chloride to induce ionic interactions in the polyurethane and thereby produce cationic type ionomers. UV stabilizers, antioxidants, and light stabilizers may be added to the cover composition.

U.S. Pat. No. 5,484,870 discloses a golf ball cover comprised of a polyurea. Polyureas are formed from reacting a diisocyanate with an amine.

U.S. Pat. No. 5,823,890 discloses a golf ball formed of a cover having an inner and an outer cover layer compression molded over a core. The inner and outer cover layers should have a color difference $\Delta E$ in Lab color space of up to 3.

U.S. Pat. No. 5,840,788 discloses a UV light resistant, visibly transparent, urethane golf ball topcoat composition for use with UV curable inks. The topcoat includes an optical brightener that absorbs at least some UV light at wavelengths greater than about 350 nm, and emits visible light, and a stabilizer package. The light stabilizer package includes at least one UV light absorber and, optionally, at least one light stabilizer, such as a HALS.

U.S. Pat. No. 5,494,291 to Kennedy discloses a golf ball having a fluorescent cover and a UV light blocking, visibly transparent topcoat. The cover contains a fluorescent material that absorbs at least some UV light at wavelengths greater than 320 nm and emits visible light.

Colored golf balls have been produced for many years. In the 1960s Spalding produced a yellow range ball with a blended cover that included polyurethane.

U.S. Pat. No. 4,798,386 makes reference to white cores and clear covers and even locating decoration on the core to be visible through the clear cover. This concept requires a core which has a satisfactory hue to achieve the desired finished ball coloration. A polybutadiene rubber core of such a color has never been produced and as such, clear cover 2-pc ball have had limited market success.

U.S. Pat. No. 4,998,734 describes a golf ball with a core, a clear cover and "layer interdisposed therebetween." However, the intermediate layer described is a thin layer of paper or plastic material whose purpose is only to bear textural, alphanumeric or graphical indicia. Meyer teaches that the layer should be sufficiently thin to permit substantial transference of impact forces from the cover to the core without substantially reducing the force.

The Pro Keds "Crystal π" golf ball appeared in the Japanese market. It had a white core bearing the ball markings and a clear Surlyn cover. This ball had a very thick clear cover (>0.065") and the surface dimple coverage was very low.

In the early 1990s, Acushnet made clear Surlyn cover, two piece Pinnacle Practice balls. The covers were 0.050" thick.

A prototype Wilson Surlyn covered two piece ball, "Quantum", of a design similar to the Pro Keds ball was found in the US in the late 1990s. The cover was greater than 0.065 inches thick.

U.S. Pat. No. 5,442,680 is directed to a golf ball with a clear ionomer cover. The patent requires a blend of ionomers with different cations.

In the early 1990s, a solid one piece urethane golf ball having a hole for the insertion of a chemi-luminescent tube was sold as a "Night Golf" ball. It was relatively translucent to create the glow, but it was far from having the performance characteristics of standard golf balls.

Two piece balls have been sold under the tradename "Glow Owl" which utilize a white core and a cover with glow in the dark materials. This ball is believed to embody the technology described in U.S. Pat. No. 5,989,135, which describes a "partially translucent" cover.

At the January 2001 PGA Show, Wilson displayed samples of "iWound" golf balls with clear covers. They were not balls for actual play but mock-ups used to display their new "lattice wound" technology. The lattice (discontinuous inner cover layer) was Hytrel and the Surlyn outer cover layer was clear. Both the Hytrel lattice and red core were visible through the clear cover. No markings were on the core or lattice.

To date, it has been difficult for manufacturers to properly attain the desired long-term appearance of polyurethane compositions used in golf ball covers without adversely affecting golf ball performance. Many golf balls have at least one layer of "paint" covering the cover material. This long-felt problem in the golf ball art has now led the Applicants to seek a desirable formulation of a polyurethane composition suitable for use in golf ball covers that exhibits improved properties and allows for substantially different looking golf balls There are a number of multilayer ball patents directed towards improving the spin, click or feel of solid balls while maintaining the distance provided by the solid construction. A variety of approaches to manipulating the core construction are described in the art. For example, U.S. Pat. No. 5,072,944 discloses a three piece solid golf ball having a center and outer layer which are prepared from a rubber composition, preferably having a base rubber of polybutadiene. This patent teaches that it is desirable that the center core is softer than the outer layer, wherein the layers have a hardness (Shore C) of 25-50 and 70-90, respectively.

U.S. Pat. No. 4,625,964 relates to a solid golf ball having a polybutadiene rubber core of a diameter not more than 32 mm, and a polybutadiene rubber intermediate layer having a specific gravity lower than that of the core material.

U.S. Pat. No. 4,848,770 discloses a non-wound three piece golf ball which includes a core of a highly filled synthetic rubber or polymeric material, an intermediate mantle of an unfilled synthetic rubber, and a cover. The core and intermediate mantle have a hardness between 50-95.

U.S. Pat. No. 5,002,281 is directed towards a three piece solid golf ball which has an inner core having a hardness of 25-70 (Shore C) and an outer shell having a hardness of 80-95 (Shore C), wherein the specific gravity of the inner core must be greater than 1.0, but less than or equal to that of the outer shell, which must be less than 1.3.

U.S. Pat. No. 5,253,871 concerns a golf ball having a three piece structure comprising an elastomer core, an intermediate layer of a thermoplastic material containing at least 10% of ether block copolymer, preferably blended with an ionomer and a thermoplastic cover.

U.S. Pat. No. 4,431,193 relates to a golf ball having a multilayer cover wherein the inner layer is a hard, high flexural modulus ionomer resin and the outer layer is a soft, low flexural modulus ionomer resin, wherein either or both layers may comprise a foamed ionomer resin.

U.S. Pat. No. 5,314,187 also relates to golf balls having a cover formed with multiple layers, wherein the outer layer is molded over the inner layer and comprises a blend of balata and an elastomer and the inner layer is an ionomer resin.

U.S. Pat. No. 4,919,434 is directed towards a golf ball having a cover which comprises an inner layer and an outer layer each of which comprise a thermoplastic resin, preferably the layers comprise materials that are capable of fusion bonding with each other.

UK Patent Application Nos. GB 2,291,817 and 2,291,812 are both directed toward a wound golf ball with improved distance comprising a dual cover layer, wherein the inner cover layer has a high hardness as compared to the outer cover layer. These references teach that the cover layers may be formed from balata or ionomer resins and should have a combined thickness of less than 4 mm.

UK Patent Application No. GB 2,278,609 discloses a multilayer golf ball providing enhanced distance without sacrificing playability or durability comprising a core, an inner cover layer and an outer cover layer wherein the inner cover layer comprises a high acid ionomer and the outer cover layer comprises a soft ionomer or a non-ionomeric thermoplastic elastomer.

Methods of manufacturing multilayer articles such as automobile headlights in a substantially different manner are discussed in U.S. Pat. Nos. 4,944,909 and 4,670,199 as well as in German Patent No. 4041799. Each of these references disclose injecting two materials through a single injection sprue or channel. The basic method is comprised of the steps of injecting a first material through a sprue into the mold and then injecting a second material into the mold through the same sprue. Due to the flow characteristics of the molten material, the first material adheres to the mold to form an outer skin and the inner material tends to flow through the center of the skin layer such that the second material is sandwiched between the first material.

Multilayer golf balls can be formed using a variety of constructions. For example, multilayer balls may have two or more cover layers molded around a conventional core with one or more intermediate layers interposed between the cover and the core. Likewise. multilayer balls may be formed from cores having more than one core layer and may optionally contain one or more intermediate and/or cover layers. Multilayer balls may even comprise a conventional wound core around which at least one intermediate layer and/or at least one cover layer is formed. Examples of multilayer balls include the Altus Newing (Bridgestone), Reygrande 2×2 (Bridgestone), Giga (Spalding), Metal Mix (Dunlop), and Ultra Tour Balata (Wilson).

SUMMARY OF THE INVENTION

The present invention relates to a co-injection nozzle for a hot runner manifold. The hot runner manifold keeps at least two materials in separate melt channels. The materials pass through the manifold in different channels and are combined at the gate. With this invention, both materials enter the mold cavity through concentric gates.

The nozzle includes a nozzle body, an inner nozzle, and an outer nozzle. The inner nozzle is placed within the outer nozzle, and the subassembly is attached to the nozzle body.

The outer surface of the inner nozzle contains radial grooves to facilitate material flow between the inner and outer nozzles. Each of the inner and outer nozzles has an orifice. The orifices are dimensioned to inject material into a mold while controlling the mixing of the materials and minimizing or eliminating waste by using a hot runner manifold.

The present invention also relates to an injection molding process for forming a multi-layer golf ball cover. The process includes the steps of providing a nozzle as herein described, providing two materials to be injected through concentric nozzle orifices, and injecting the materials into a mold. The first and second materials may be injected into the mold simultaneously. The first material substantially fills the mold cavity, and the second material is injected inside the first material.

The present invention is also directed towards a golf ball having a multi-layer cover formed by the process herein described. The first material is divided into an inner layer and an outer layer by an injected intermediate layer of a second material.

DESCRIPTION OF THE DRAWINGS

The present invention is described with reference to the accompanying drawings, in which like reference characters reference like elements, and wherein.

DETAILED DESCRIPTION OF THE INVENTION

Figure 1:
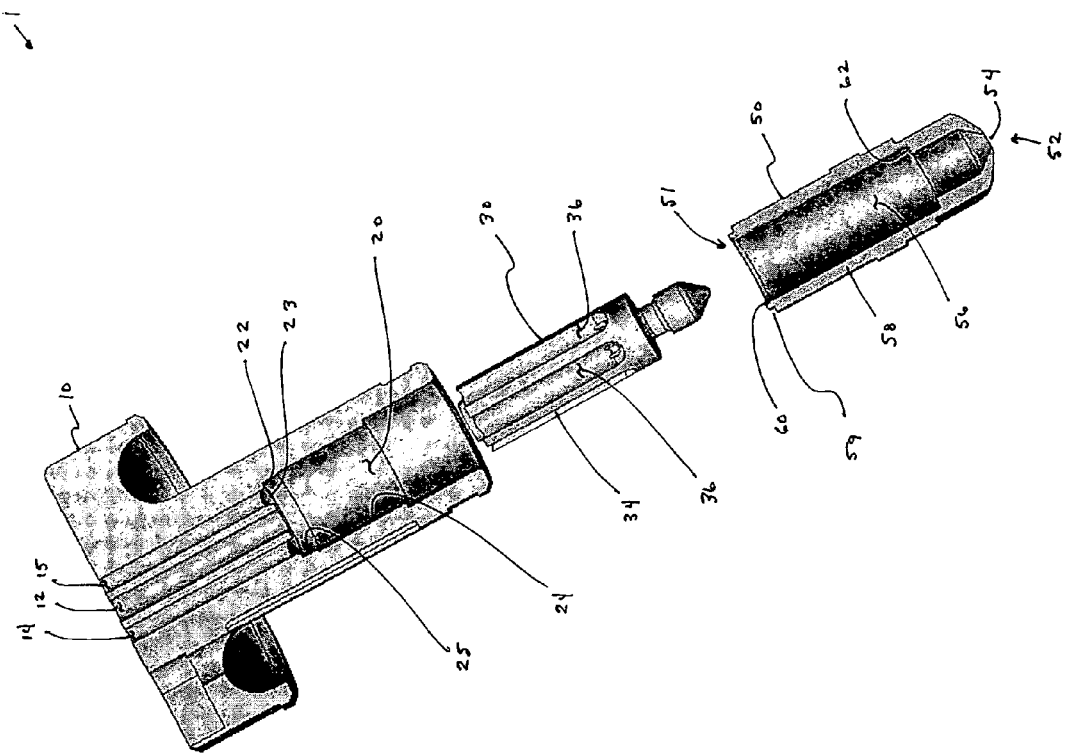
FIG. 1 shows an exploded and partially cross-sectional view of a nozzle of the present invention.
Figure 2:
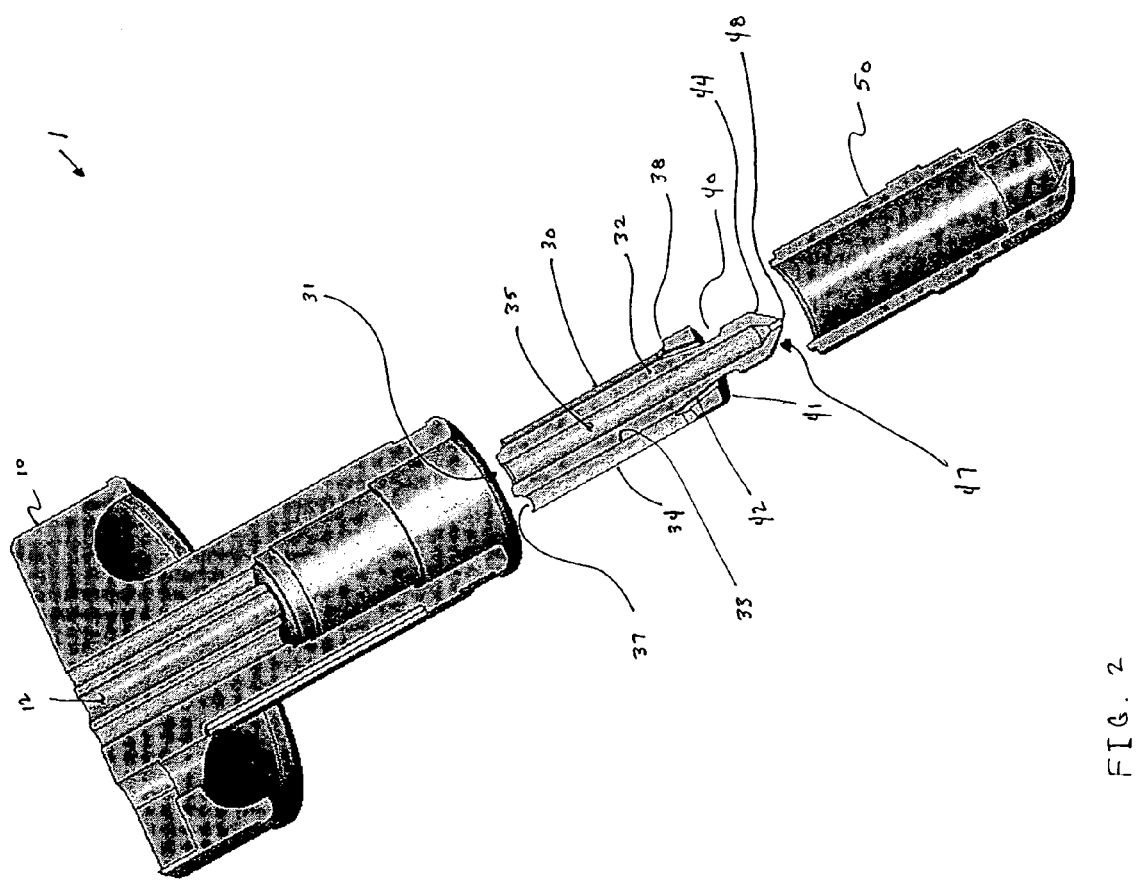
FIG. 2 shows an exploded and fully cross-sectional view of the nozzle of FIG. 1.

FIG. 1 shows an exploded and partially cross-sectional view of a nozzle 1 of the present invention. FIG. 2 shows an exploded and fully cross-sectional view of nozzle 1. Nozzle 1 includes a nozzle body 10, an inner nozzle 30, and an outer nozzle 50.

Nozzle body 10 includes a counter bore 20 defining an interior region with an inner wall 24. Nozzle body 10 further includes a first passageway 12, a second passageway 14, and, optionally, a third passageway 15 extending through nozzle body 10 from a distal end thereof to counter bore 20. Counter bore 20 defines a ledge 22 that contains an annular groove 23 therein. Annular groove 22, which preferably has a hemispherical shape, is in fluid communication with nozzle body second and third passageways 14, 15. A portion 25 of wall 24 is threaded for receiving outer nozzle section 50.

Outer nozzle 50 is removably and fixedly coupled to nozzle body 10 at a first end 51 and has an orifice 54 at a second end 52. As used herein, "removably and fixedly coupled" means that outer nozzle 50 can be coupled or decoupled from nozzle body 10, and when it is coupled to nozzle body 10 it is relatively immovable with respect to nozzle body 10. Outer nozzle 50 has a passageway 56 therethrough in fluid communication with nozzle body second and third passageways 14, 15. A wall 58 of outer nozzle 50 contains a threaded portion 59 that matingly engages nozzle body inner wall threaded portion 25 to retain outer nozzle 50 within nozzle body 10. Outer nozzle 50 includes an annular groove 60 on an inner end of wall 58 positioned to matingly engage nozzle body annular groove 23 to provide fluid communication between nozzle body second and third passageways 14, 15 and an inner surface of outer nozzle wall 58. Outer nozzle annular groove 60 preferably has a hemispherical shape. Outer nozzle 50 further includes a ledge 62 in the inner surface of wall 58.

Inner nozzle 30 is positioned within outer nozzle passageway 56, and includes a first end 31 and a second end 47 having an orifice 48. Inner nozzle 30 includes a wall 32 having an inner surface 33 and an outer surface 34. Inner surface 33 defines a passageway 35 through inner nozzle 30. Inner nozzle passageway 35 is in fluid communication with nozzle body first passageway 12. Inner nozzle wall outer surface 34 contains an annular groove 37, which preferably has a hemispherical shape, in an innermost part thereof. Inner nozzle wall outer surface 34 also contains a plurality of radial grooves 36 that are in fluid communication with nozzle body second and third passageways 14, 15. The path of fluid flow through outer nozzle 50 is defined by the inner surface of outer nozzle wall 58 and inner nozzle wall outer surface 34, including radial grooves 36.

Inner nozzle 30 includes an alignment diameter 38 defining a ledge 41. Radial grooves 36 extend from inner nozzle first end to alignment diameter 38. Inner nozzle 30 further includes an annular groove 40 between alignment diameter 38 and inner nozzle orifice 48. Outer passageways 42 are provided in inner nozzle 30 and furnish fluid communication between radial grooves 36 and inner nozzle annular groove 40. There are preferably a plurality of outer passageways 42 dispersed evenly around inner nozzle 30. Inner nozzle includes a tapered section 44 between inner nozzle annular groove 40 and inner nozzle second end 47, an end of which in conjunction with outer nozzle end 52 defines outer nozzle orifice 54. Thus, outer nozzle orifice 54 is annular. Inner nozzle tapered section 44 preferably extends from end 47 to some point between end 47 and annular groove 40, but it need not extend completely to annular groove 40.

Figure 3:
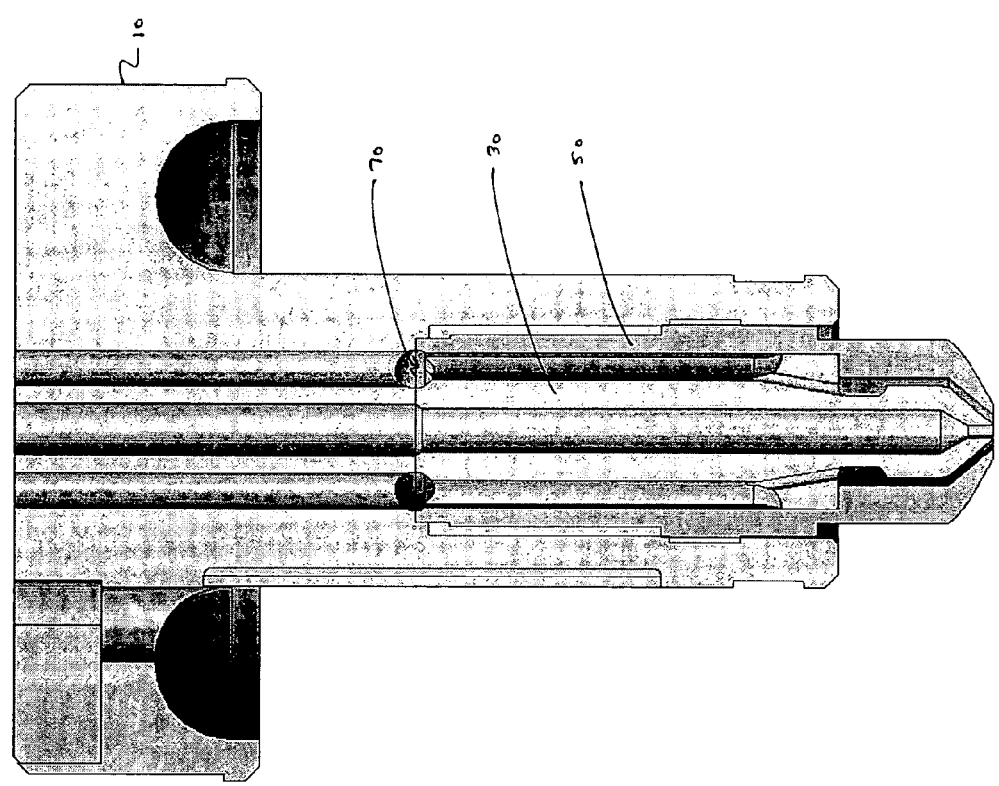
FIG. 3 shows an assembled, cross-sectional view of the nozzle of FIG. 1.

FIG. 3 shows an assembled, cross-sectional view of nozzle 1. Nozzle 1 is assembled by first placing inner nozzle 30 within outer nozzle passageway 56. Inner nozzle ledge 41 is configured to matingly engage outer nozzle ledge 62.

Outer nozzle passageway 56 preferably is sized to provide minimal clearance with inner nozzle outer surface 34. The ledges 41, 62 act as a stop, positioning inner nozzle 30 at a desired position within outer nozzle 50. Annular grooves 37, 60 align in this position and cooperate to create a groove underneath nozzle body second and third passageways 14, 15. Inner nozzle 30 fits within outer nozzle 50 such that there is a light, sliding fit therebetween. The junction between inner nozzle 30 and outer nozzle 50 around ledges 41, 62 act to both provide a seal and align inner and outer nozzles 30, 50. Similarly, the junction between inner nozzle 30 and outer nozzle 50 around ends 31, 51 ensures proper alignment between inner and outer nozzles 30, 50. By providing two positive alignment diameters, movement relative inner and outer nozzles 30, 50 due to any cantilever force is prevented.

The inner nozzle 30, outer nozzle 50 subassembly is then inserted into and coupled to nozzle body counter bore 20. In a preferred embodiment, outer nozzle threaded portion 59 is matingly engaged with nozzle body inner wall threaded portion 25 to retain the subassembly within nozzle body 10. In this position, inner nozzle 30 is retained such that said inner nozzle passageway 35 is in fluid communication with nozzle body first passageway 12 and outer nozzle passageway 56 is in fluid communication with nozzle body second and third passageways 14, 15. Preferably, nozzle body 10, inner nozzle 30, and outer nozzle 50 are all substantially concentric. Inner nozzle orifice 48 and outer nozzle orifice 54 are substantially concentric and substantially coplanar; and outer nozzle orifice 54 substantially surrounds inner nozzle orifice 48. Alternatively, the orifices 48, 54 are not coplanar.

In use, a first material is fed into nozzle body first passageway 12 in known fashion. This typically entails loading pellets into a hopper, where they feed by gravity or other means to a screw. Heat is applied to plasticize the pellets and the screw turns to pump a measured amount of plasticized material into passageway 12. Other pieces, such as a hot runner manifold, may be used and may be provided intermediate the screw and the nozzle. The material is heated above its melt temperature and preferably to a temperature greater than about 400° F. A second material is fed to nozzle body second and third passageways 14, 15 in a similar manner.

A melt flipper may be used to create a balance of thermal, flow, and material properties to all cavities in the mold. This is particularly beneficial where the runner system has more than two branches. Imbalances in temperature, flow and material properties can result from non-symmetrical shear distribution within the melt as it travels through the runner system. To remedy these imbalances, a melt flipper rearranges the shear induced variation of the injected material so that the properties of the material entering each cavity are essentially the same. A melt flipper rearranges the shear induced variations in the runner by introducing the injected material into a branch of a runner system at an angle that is approximately perpendicular to the plane in which the branches of the runner system are located in the mold. Preferably, a multiplate melt flipper, which facilitates redirection of multiple melt flows and the distribution thereof to concentric flow paths, is used. For additional information regarding melt flippers, see U.S. Pat. No. 6,235,230, which is incorporated herein by reference in its entirety.

Each of the first and second materials has an independent flow path through nozzle 1. In an inner melt path, the first material is fed from nozzle body first passageway 12, passes through inner nozzle passageway 35, and is emitted through inner nozzle orifice 48.

In an outer melt path, the second material is fed from nozzle body second and third passageways 14, 15. Upon exiting nozzle body 10, the second material enters the aligned annular grooves 37, 60, which provide an annular channel 70. The second material flows from annular channel 70 between inner nozzle 30 and outer nozzle 50 along radial grooves 36. Annular channel 70 functions as a pressure drop to ensure even distribution of material to all of radial grooves 36. The second material flows down radial grooves 36 to alignment diameter 38. Since ledges 41, 62 are configured to provide a snug fit between inner nozzle 30 and outer nozzle 50, no material can flow therebetween. Therefore, outer passageways 42 are provided. The second material flows from radial grooves 36, through outer passageways 42, and into inner nozzle annular groove 40. Annular groove 40 provides another pressure drop to ensure even flow around the smooth, conical tip of inner nozzle 30. The second material flows between the tapered portions of nozzles 30, 50, and is exited from orifice 54.

Figure 4:
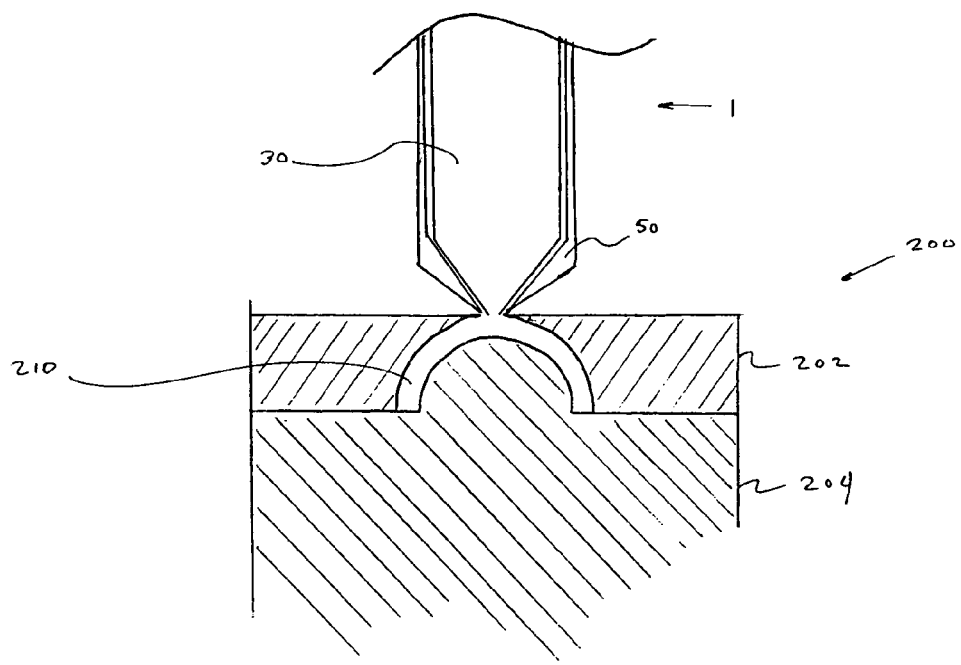
FIG. 4 shows a cross-sectional view of the nozzle of FIG. 1 set up to inject materials into a mold.

FIG. 4 shows a cross-sectional view of nozzle 1 set up to inject materials into a mold 200. In the illustrated embodiment, nozzle 1 is immediately adjacent mold 200. Since no runner system is used, the amount of waste produced is reduced. Mold 200 contains two mold plates 202, 204 that cooperate to form a mold cavity 210. In the illustrated embodiment, mold 200 is a half-shell mold. Two of the formed shells are subsequently compression molded around a core to form a golf ball.

Initially, only the first material enters mold cavity 210. Mold halves 202, 204 are cooled so that the molten material solidifies in mold cavity 210. Preferably, mold halves 202, 204 are maintained at a temperature below about 100° F. Most preferably, the mold halves are maintained at a temperature below 60° F. so that the molten material freezes to the mold walls. Thus, the first material flows into mold cavity 210 and substantially adheres to the cavity surfaces. Since there is a sharp temperature gradient in the first material, hot in the center and cold on the edges against mold halves 202, 204, the flow of material is much easier through the center. The material must be pushed into mold cavity 210 with sufficient pressure to allow the material to fill cavity 210 before it solidifies. Preferably, the injection pressure is greater than about 2000 psi.

Figure 5:
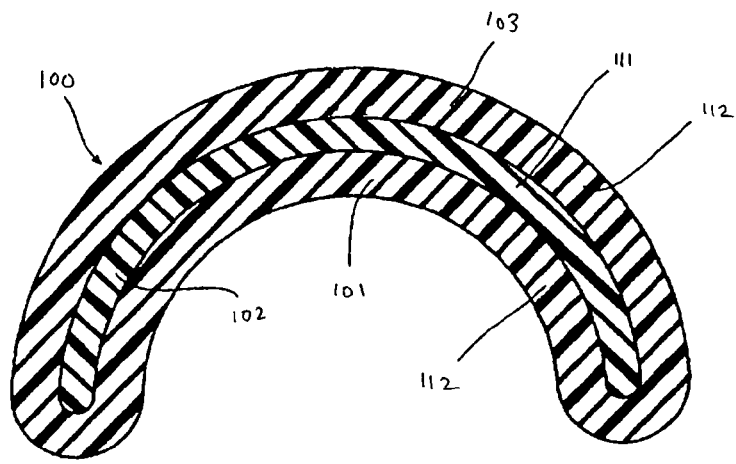
FIG. 5 shows a half-shell made according to the present invention.

The first material substantially fills mold cavity 210. The second material follows the first material. Since mold 200 is maintained at a temperature much lower than the melting temperature of the first material, the first material solidifies against the surfaces of mold cavity 210 as it flows into mold cavity 210. The middle or center of the first material is at a s higher temperature than the periphery of the first material and is, therefore, softer. Thus, the flow of the second material into mold cavity 210 is through the center of the first material. Since the second material follows the first material, the flow creates an inner and an outer layer formed of the first material, and an intermediate layer formed of the second material. FIG. 5 shows a half-shell or cup 100 made according to the present invention. Inner layer 101 and outer layer 103 are formed of first material 112, and intermediate layer 102 is formed of second material 111. In order to increase the thickness of intermediate layer 102, more second material 111 can be used and the flow rate into mold 200 decreased. Once first and second materials 111, 112 cool enough to substantially retain the shape of mold cavity 210, mold halves 202, 204 are separated and half-shelf 100 is removed.

Sandwich injection molding creates an area at the point of injection in which the first and second materials are layered. This is because the second material is fully ejected from the nozzle and then the first material is subsequently ejected. Such contaminated areas 105 are undesirable. The present invention minimized and avoids contaminated areas 105 by simultaneously injecting the materials 111, 112. While initially only first material 112 enters mold cavity 210, injection of second material 111 is initiated a fraction of a second later. After second material 111 has been completely injected into mold cavity 210, first material 112 may continue to be injected, eliminating contamination. Alternatively, injection of second material 111 may be initiated simultaneously with injection of first material 112. This may require variation of the injection rates.

The dimensions of orifices 48, 54 of nozzle 1 also help avoid contamination. Orifices 48, 54 are small, reducing the area where the materials can mix. This creates a substantially self-flushing nozzle. Preferred dimensions for orifices 48, 54 are approximately 0.020 inch to approximately 0.150 inch for orifice 48 and approximately 0.050 inch to approximately 0.250 inch for orifice 54. The orifice dimensions may also be characterized relatively, in which the ratio of the orifice diameters (outer nozzle:inner nozzle) is preferably from approximately 1:1 to approximately 10:1. More preferably, the ratio is less than 5:1. Most preferably, the ratio is less than 3:1.

Figure 7:
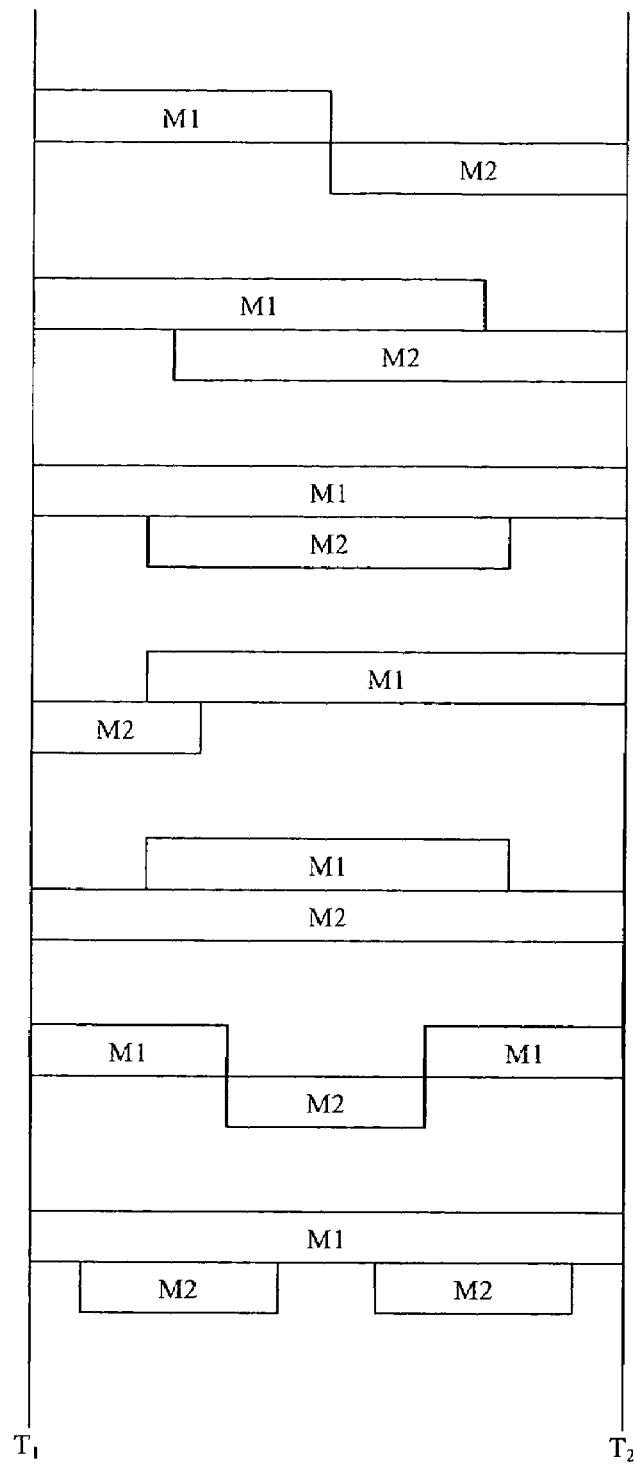
FIG. 7 shows several exemplary injection timing schemes for a first material and a second material.

FIG. 7 shows several exemplary injection timing schemes for a first material (M1) and a second material (M2). Injection begins at time $T_1$ and ends at time $T_2$, as read from left to right. In a first exemplary scheme, each material is injected separately. A first material is initially injected. Upon completing of the first material injection, a second material is injected. Preferably, the first and second materials are injected for substantially the same length of time.

In a second exemplary injection scheme, a first material is initially injected. In contrast to the first exemplary scheme, injection of the second material begins prior to completion of the first material injection. For approximately half of the total injection time, both the first and the second materials are being simultaneously injected. After all of the first material has been injected, the second material continues to be injected to complete the injection cycle. Preferably, the first and second materials are injected for substantially the same length of time.

In a third exemplary injection scheme, the first material is injected during the entire injection time. The first material is initially injected exclusively. Then the second material is injected for a portion of the remaining injection time. Upon completion of the second material injection, the first material is again injected exclusively for the remainder of the injection time.

In a fourth exemplary injection scheme, the second material is initially injected exclusively. The second material is injected for a relatively short portion of the entire injection time. Injection of the first material begins while the second material is still being injected. After injection of the second material is complete, the first material is injected exclusively for the remainder of the injection time.

A fifth exemplary injection scheme is similar to the third exemplary injection scheme, but the materials are reversed. The second material is injected during the entire injection time, and is initially injected exclusively. Then the first material is injected for a portion of the remaining injection time. Upon completion of the first material injection, the second material is again injected exclusively for the remainder of the injection time.

In a sixth exemplary injection scheme, the first material is initially injected exclusively. After a predetermined time has elapsed, injection of the first material is ceased and the second material is injected exclusively. After a predetermined time, injection of the second material is ceased and the first material is again injected, and is injected exclusively. Preferably, the total injection time of the first material is substantially double the injection time of the second material.

In a seventh exemplary injection scheme, the first material is injected during the entire injection time, and is initially injected exclusively. The second material is then injected for an initial time duration, is ceased, and then is injected again for a second time duration. After the second time duration has elapsed, the first material is again injected exclusively for the remainder of the injection time. Preferably, the total injection time of the second material is substantially half of the injection time of the first material.

Figure 8:
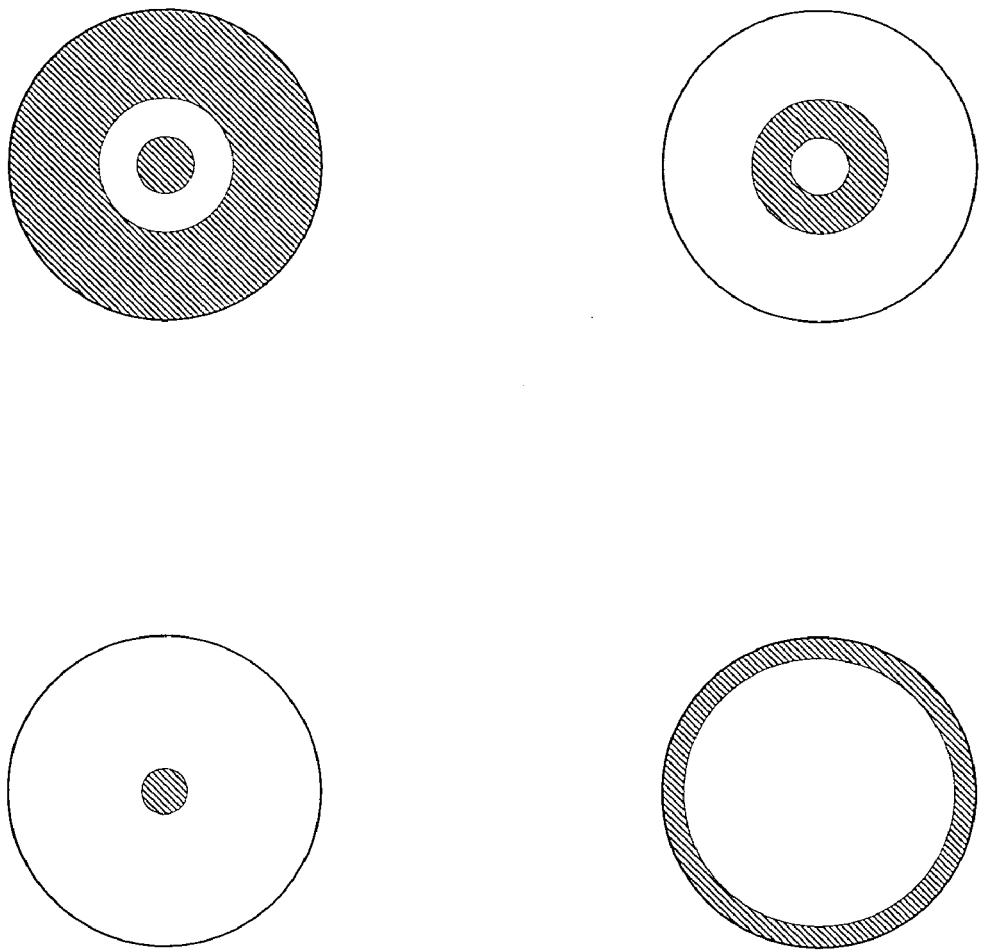
FIG. 8 shows pole views of several exemplary color distributions that can be achieved through the injection timing schemes of FIG. 7.

These exemplary injection timing schemes of FIG. 7 are presented for illustrative purposes only. There are innumerable other possible schemes that may also be used. Additionally, the first and second materials may be first and second sources of the same material. Each of these schemes results in a golf ball product with different characteristics. The difference in the appearance of the golf ball products may be accentuated if the first and second materials are of differing colors. For example, the first material, or a first portion of a common material, may be provided with a first pigment additive and the second material, or a second portion of a common material, may be provided with a second pigment additive, the second pigment additive being of a different color than the first pigment additive. Depending on the specific injection timing scheme used, the pigments will be end up at different positions on the golf ball product. This allows a variety of novel golf ball designs to be created. FIG. 8 shows pole views of several golf ball products with exemplary color distributions that can be achieved through the aforementioned injection timing schemes. Again, innumerable other designs are possible. While any desired pigments can be used, one pigment is preferably substantially white and the other pigment is preferably colored other than white, a preferred color being fluorescent yellow. Preferably, the first material or portion forms approximately 10% to approximately 90% of said layer.

Figure 6:
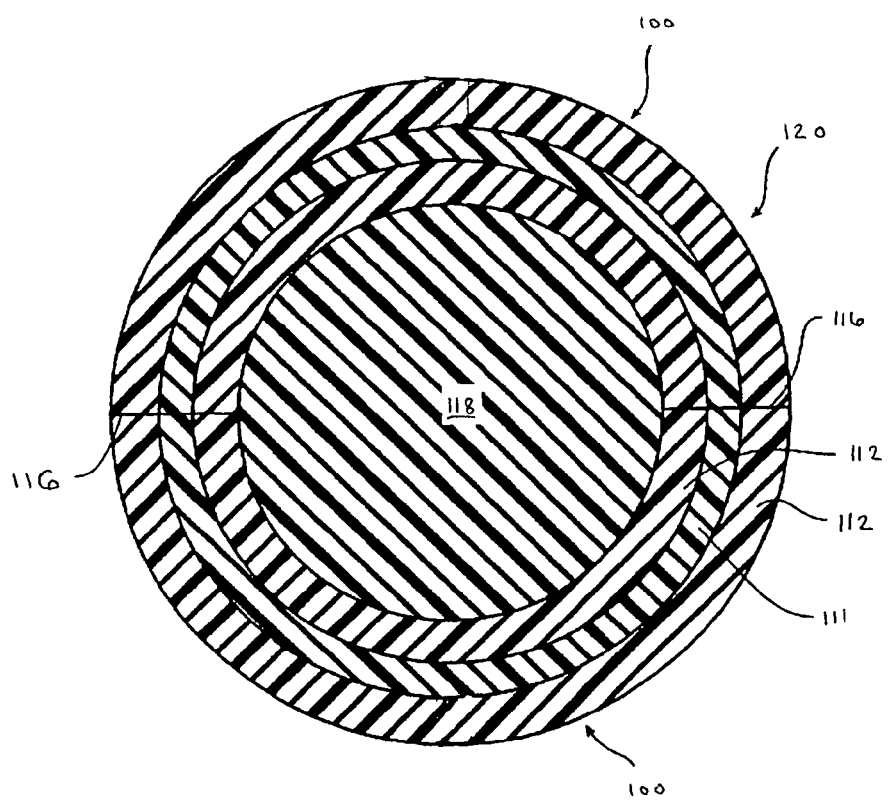
FIG. 6 shows a golf ball product made according to the present invention.

FIG. 6 shows a golf ball product 120 made according to the present invention. Core 118 is surrounded by two three-layer hemispheres 100 that have been compression molded together, thereby forming compression molding seam 116. Compression molding hemispheres onto a core generally involves applying pressure and heat to mold the cover hemispheres onto the core and is known in the art. It is contemplated that core 118 is a solid, polybutadiene type core, a solid core having multiple layers, or a wound core.

Cups 100 typically include a larger volume than is needed for the final golf ball product. Cups 100 can include up to 50% larger volume than is actually needed. When cups 100 are compressed, the cup material liquefies and the extra volume flows out of the mold. In this manner, outer layer 103 can be completely removed. This also varies the percentages of the first and second materials that are present after the cups are molded onto the core versus the percentage of the first and second materials that are present in the cups prior to being compression molded. For example, with the third exemplary injection timing scheme of FIG. 7, the first material may comprise 60% of the resulting cup and the second material 40%. After being compression molded, however, first material may comprise only 20% of the cover and the second material 80%.

Thus, the final golf ball product may comprise a core and a two-layer cover over the core, the cover containing an inner layer and an outer layer. The inner layer may be thicker or thinner than the outer layer. When the inner layer is thinner, it preferably has a thickness from approximately 0.010 inch to approximately 0.050 inch. When the outer layer is thinner, it preferably has a thickness from approximately 0.005 inch to approximately 0.065 inch.

While the above discussion has centered on varying the injection times of the respective materials or portions to achieve novel golf ball designs, similar golf ball products may be created by varying other manufacturing factors. Exemplary manufacturing factors, in addition to injection timing, include the injection speed or rate, the volume of each material, sequencing or delaying, holding pressure, and material temperature. Any combination of these factors, or additional factors, may be varied to produce golf ball products of the present invention.

Figure 9:
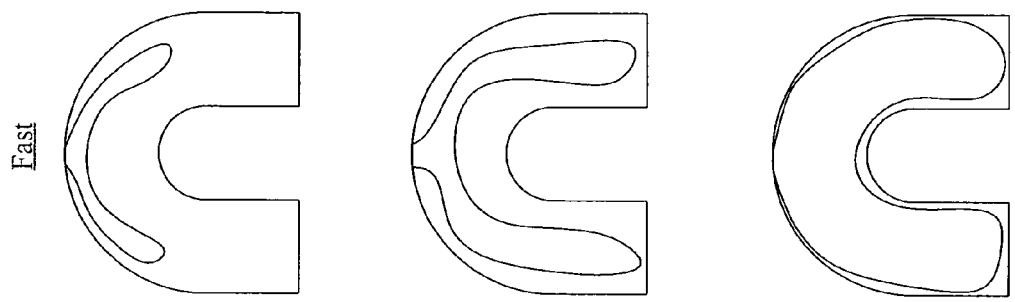
FIG. 9 shows several cross-sectional views of a cup mold filled with first and second materials of varying relative volume and inserted at varying rates.
Figure 9:
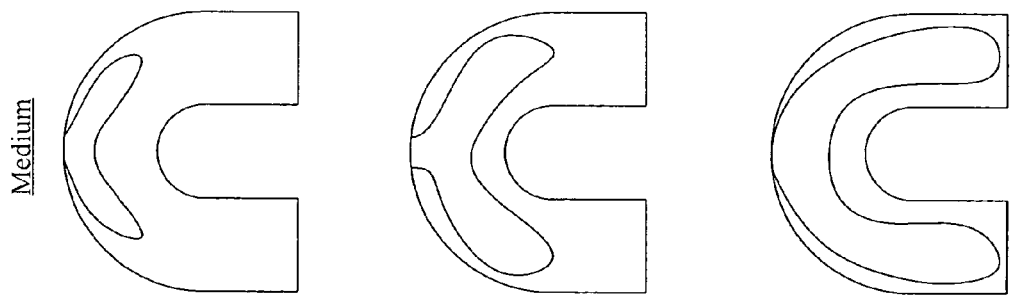
Figure 9:
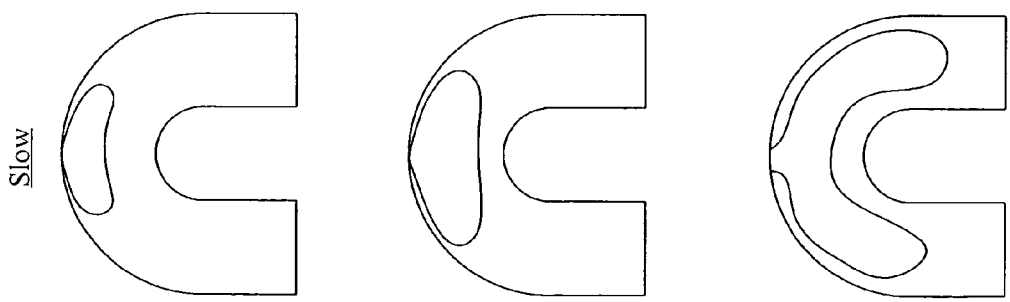
Figure 10:
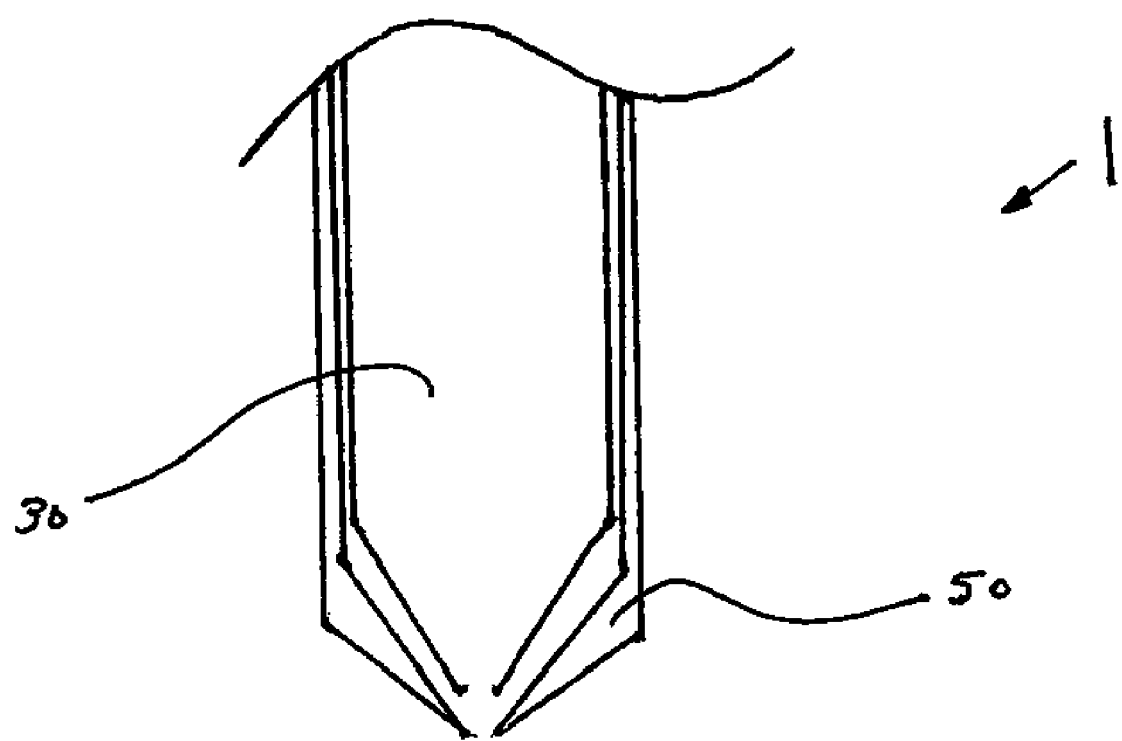
FIG. 10 shows a cross-sectional view of a nozzle of the present invention.

FIG. 9 shows several cross-sectional views of a cup mold filled with first and second materials of varying relative volume and inserted at varying rates. The mold volumes of the first row contain 70% of a first material and 30% of a second material. The mold volumes of the second row contain 50% of a first material and 50% of a second material. The mold volumes of the third row contain 30% of a first material and 70% of a second material. The second material was inserted into the mold volumes of the first column at a relatively slow rate. The second material was inserted into the mold volumes of the second column at a relatively medium rate. The second material was inserted into the mold volumes of the first column at a relatively fast rate.

It is seen that the insertion rates affect only the shape of the volume of the second material within the first material. Regarding the first row, in which the volume of the second material comprises 30% of the mold volume, it is seen that the shape of the second material volume becomes longer and thinner as the insertion rate is increased. When inserted at a slow rate, the second material is concentrated near the gate. When inserted at a medium rate, the second material extends farther into the first material, but is thinner. When inserted at a fast rate, the second material extends even farther into the first material, but is even thinner. In the finished golf ball product, it is likely that the second material will be concentrated near the pole when inserted at a slow rate. When inserted at a fast rate, the finished golf ball product will likely contain a very thin layer of the second material that extends substantially from the pole to the equator. There may likely be no outer layer 103 in the finished golf ball product, in which case the second material would form the outer cover layer and the first material would form the inner cover layer. In this setup, the outer cover layer would be thinner than the inner cover layer.

The second row of molds, in which the mold volumes contain equal amounts of the first and second materials, are similar to the first row. It is seen that the second material extends farther into the first material, and extends almost to the bottom of the mold when inserted at a fast rate. The finished golf ball products will also be similar to the finished golf ball products made according to the first row of molds. After molding the cups onto the core, there likely will be no outer layer. The resulting finished golf ball product would have a dual cover with the inner and outer layers being of substantially the same thickness.

In the third row of molds, in which the volume of the second material comprises 70% of the mold volume, the second material extends far into the first material, even when injected at a slow rate. The resulting finished golf ball products will have a two-layer cover, with the outer layer being thicker than the inner layer.

Thus, it is seen that by varying the injection rates and the relative volumes of the first and second materials (or portions of a common material), one may produce a variety of golf ball designs in which the cover may have two or three layers or varying relative thicknesses.

It should be noted that the layer formed by the cups need not be the outermost layer of the golf ball product. Other layers may be formed atop the cup layer. For example, after forming a multi-color layer using the techniques of the present invention, a substantially translucent layer may be formed over the multi-colored layer. The translucent layer may be formed in the same manner as the multi-colored layer, or by any other manufacturing technique. Thus, the product formed by the compression-molded cups may by a secondary golf ball product to which additional layers may or may not be added.

In a preferred embodiment, the first and second materials have different hardnesses. For example, the first material can have a hardness less than 63 Shore D and the second material can have a hardness of greater than 65 Shore D. Depending of the specific injection characteristics used, the finished golf ball product could have a thin, hard outer layer over a softer inner layer, a hard outer layer over a soft inner layer, etc. The hardnesses of the layers may also be expressed in relative terms, such as by an amount of difference between the hardnesses of the layers. In a preferred embodiment, the difference in the hardnesses is greater than approximately 5 Shore D. The difference is also preferably less than approximately 25 Shore D. More preferably, the difference is less than approximately 15 Shore D. Still more preferably, the difference is less than approximately 10 Shore D.

Preferably, outer cover layer 103 is formed of a substantially translucent material and intermediate cover layer 102 contributes to the overall color of the golf ball. Note that, as discussed above, the cover may contain only two layers. See U.S. patent application Ser. No. 10/384,414, now pending, which is incorporated herein by reference in its entirety. This construction can provide a number of significantly different looking balls. In one preferred embodiment, outer layer 103 is the reaction product of a prepolymer including at least one polyisocyanate and at least one polyol or polyamine with at least one curing agent. Outer layer 103 may also include a color stabilizer package as set forth in detail below.

Preferably, outer layer 103 is comprised of clear, unpigmented urethane or urea over a colored golf ball precursor. For example, the outer layer 103 is clear and the intermediate layer 102 is colored. Any color(s) may be used to create golf balls according to the present invention. In Japan, and to a lesser extent in the US, various pastel shades of blue, green, and others have appeared on the cover of two-piece balls. These colors could be obtained from using the pigment in intermediate layer 102 while outer layer 103 includes either a fluorescent dye or optically active chemical additive to further enhance the color.

A preferred embodiment of golf ball product 120 includes a clear outer layer 103, one as close to optically transparent as possible, but in other embodiments a merely translucent layer may be preferred. The use of a lightly colored or tinted outer layer makes possible color depth characteristics not previously possible. Similarly, intermediate layer 102 and/or outer cover layer 103 can contain reflective or optically active particulates such as described in U.S. Pat. No. 5,427,378, which is incorporated by reference herein in its entirety. In particular, these materials could be used in intermediate layer 103 of the present invention and covered with a clear outer layer 103. Pearlescent pigments sold by the Mearle Corporation can also be used in this way or can be added to the substantially clear outer layer 103.

If employed, it is preferable that the reflective material comprises at least one member selected from the group consisting of metal flake, iridescent glitter, metallized film, and colored polyester foil. The reflective particles preferably have faces that have an individual reflectance of over 75%, more preferably at least 95%, and most preferably 99-100%. For example, flat particles with two opposite faces can be used.

The maximum particle size of the reflective particles should be smaller than the thickness of the cover, and preferably is very small. The particle size preferably is 0.1 mm-1.0 mm more preferably 0.2 mm-0.8 mm, and most preferably 0.25 mm-0.5 mm. The quantity of reflective particles may vary widely, as it will depend upon the desired effect and is best determined experimentally. In general, an aesthetically pleasing reflective appearance can be obtained by using about 0.1-10, or more preferably 1-4 parts by weight reflective particles in the material.

One of the advantages of the at least partially translucent outer layer 103 are that smaller amounts of dye, pigment, optical brightener, and/or metal flake are needed than would be required if outer layers 103 were made of an opaque material. If an opaque outer layer 103 were formed, it would be necessary to have complete color coverage on the outer surface of outer layer 103. However, in accordance with the present invention, pigment, dye, and reflective particles, which are well beneath the outer surface, contribute to the visibility of the ball.

Golf balls with clear outer layers 103 also have a unique appearance. The portion of the cover at edges of the dimples being thicker than the cover at the base of the dimples creates a "shadow" effect on the opaque surface below the clear outer layer 103. The thicker the clear outer layer 103, the more pronounced the effect. For example, outer layers 103 having a thickness of between 0.05 and 0.1 inch. A preferred embodiment of the present invention has a thinner outer layer 103 with a lesser effect. In a preferred mode, clear outer layer 103 will have a thickness of less than about 0.050 inches. In a most preferred embodiment, it will be less than about 0.040 inches. The urethane and urea examples described herein preferably have thicknesses between about 0.03 and 0.035 inches.

Also, higher dimple surface coverage creates a more appealing look. The examples described herein preferably have dimple surface coverage in excess of 80% of the surface of the ball. With high surface coverage and a thin cover, the edges of the dimple "shadows" merge to give the illusion that they are the surface of the ball. With sufficient dimple coverage, the dimple shadows take on a hexagonal appearance. This is most apparent in the optic yellow urethane and urea examples or in surlyn cover examples in which the outer cover is dyed with blue optical brightener.

The term optical brightener as used herein is generally the same as that set forth in Kirk-Othmer, Encyclopedia of Chemical Technology, 3d Edition, Volume 4, page 213. As there stated, optical brighteners absorb the invisible ultraviolet portion of the daylight spectrum and convert this energy into the longer-wavelength visible portion of the spectrum. Kirk-Othmer describes typical optical brighteners, including stilbene derivatives, styryl derivatives of benzene and biphenyl, bis(benzazol-2-yl)derivatives, coumarins, carbostyrils, naphthalimides, derivatives of dibenzothiophene-5,5-dioxide, pyrene derivatives, and pyridotriazoles. In accordance with the present invention, any of these or other known optical brighteners including derivatives of 4,4'-diamino stilbene-2,2'-disulfonic acid, 4-mthyl-7-diethylamino coumarin and 2,5-bis(5-tert-butyl)-2-benzoxazolyl) thiophene may be used.

The amount of optically active materials to be included in the golf ball cover layer is largely a matter of choice. The amount can range anywhere from the minimum 0.03% level to 20% or more by weight of the resin solids in the clear coat. We have found an amount of about 0.3 to 7% by weight to be a very desirable amount and most prefer an amount of about 0.7% to 6%. However, the brightness can be made even a little greater by adding a greater amount of optically active material.

Fluorescent materials useful in the present invention are commercially available fluorescent pigments and dyes. Some are described in U.S. Pat. Nos. 2,809,954, 2,938,873, 2,851,424 or 3,412,036, which are incorporated by reference herein. A good commercial source for these products is Dayglo Color Corporation. As described in the cited patents, these fluorescent daylight materials are organic co-condensates. They are typically composed of melamine, an aldehyde such as formaldehyde, a heterocyclic compound and/or an aromatic sulfonamide. Typical of such materials is Solvent Yellow 44, including compounds which are sold by DayGlo under the trademark Saturn Yellow and by Lawter under the trademark Lemon Yellow. The amount of fluorescent material to be used is largely a matter of choice depending on the brightness desired. However, it is preferred that the amount of fluorescent dye be from about 0.01% to about 0.5% by weight of the cover composition and the amount of fluorescent pigment be from about 0.5% to about 6% by weight of the cover composition.

In general, fluorescent dyes useful in the present invention include dyes from the thioxanthene, xanthene, perylene, perylene imide, coumarin, thioindigoid, naphthalimide and methine dye classes. Useful dye classes have been more completely described in U.S. Pat. No. 5,674,622, which is incorporated herein by reference in its entirety. Representative yellow fluorescent dye examples include, but are not limited to: Lumogen F Orange 240 (BASF, Rensselaer, N.Y.); Lumogen F Yellow 083 (BASF, Rensselaer, N.Y.); Hostasol Yellow 3G (Hoechst-Celanese, Somerville, N.J.); Oraset Yellow 8GF (Ciba-Geigy, Hawthorne, N.Y.); Fluorol 088 (BASF, Rensselaer, N.Y.); Thermoplast F Yellow 084 (BASF, Rensselaer, N.Y.); Golden Yellow D-304 (DayGlo, Cleveland, Ohio); Mohawk Yellow D-299 (DayGlo, Cleveland, Ohio); Potomac Yellow D-838 (DayGlo, Cleveland, Ohio), and Polyfast Brilliant Red SB (Keystone, Chicago, Ill.).

A single fluorescent dye may be used to color an article of the invention or a combination of one or more fluorescent dyes and/or or optical brighteners and one or more conventional colorants may be used.

Because of the relatively unstable nature of optically active pigments and dyes, and especially because of the outside use to which golf balls are put, it is preferred that an UV stabilizer be added to the urethane and urea cover compositions. If either the optically active material or the cover material comes with sufficient UV stabilizer, it is obviously not beneficial to add more. However, UV absorbers are preferably present in the amount of from about 0.1% to about 3.0% by weight of the cover, and more preferably from about 0.5% to about 2.0%.

Alternatively, a conventional dye instead of a fluorescent dye can be used. Examples of non-fluorescent dye classes that can be used in the present invention include azo, heterocyclic azo, anthraquinone, benzodifuranone, polycyclic aromatic carbonyl, indigoid, polymethine, styryl, di- and tri-aryl carbonium, phthalocyanines, quinopphthalones, sulfur, nitro and nitroso, stilbene, and formazan dyes. The concentration of dye needed is specific to each application. However, typically between about 0.01 and 1 weight percent of regular dye based on total composition cover material is preferable. It will be understood that articles with dye loadings outside this range can also be used in accordance with this invention.

In one preferred embodiment, to maintain color of the fluorescent cover, a UV overlay layer or coating which effectively filters radiation below 380 nm is used. Hindered amine light stabilizers (HALS) can also be added to polycarbonate type matrixes to enhance the durability of fluorescent dyes contained therein.

As discussed in more detail below, the present invention also relates to an embodiment comprising interpenetrating polymer networks or semi-interpenetrating polymer networks comprising a fluorescent dye or non-fluorescent having enhanced durability.

Interpenetrating polymer networks (IPNs), systems comprising two independent cross-linked polymer networks, are known to those of ordinarily skill in the art. See, for example, Encyclopedia of Polymer Science and Engineering Vol. 8, John Wiley & Sons, New York (1987) p. 279 and L. H. Sperling, Introduction to Physical Polymer Science, John Wiley & Sons (1986) pp. 46-47. In particular, IPNs comprising acrylate and urethane networks have been prepared by either sequential or simultaneous (but independent) polymerization of free-radically polymerizable ethylenically-unsaturated acrylate-type monomers and urethane precursors, i.e., polyisocyanate and polyhydroxy coreactants. See, for example, U.S. Pat. Nos. 4,128,600, 4,342,793, 4,921, 759, 4,950,696, 4,985,340, 5,147,900, 5,256,170, 5,326,621, 5,360,462, and 5,376,428, which are incorporated by reference.

Articles containing colorants are known to lose their color when exposed to solar radiation for extended times. In particular, fluorescent colorants degrade more quickly than conventional colorants, often turning colorless on exposure to daily solar radiation in a matter of days or months. Even though they are less durable, fluorescent dyes are commonly used for increased visibility of an article due to the visual contrast between a dyed article and its surroundings.

In another preferred embodiment, the cover comprises single phase polymers comprising pigments or dyes such as those, for example, U.S. Pat. Nos. 3,253,146, 5,605,761, and 5,672,643, which are incorporate by reference herein.

In other embodiments comprised of fluorescent products in polyvinylchloride, olefin copolymers and polyurethanes dispersal of a second phase, preferably an acrylate phase, is used. More preferably, an aromatic acrylate phase is dispersed into these thermoplastic resins. Preferably, the dispersal provides for the covalent attachment of the fluorescent dye to assist in preventing physical loss of the dye, and provides a protective environment for the dye against photodegradation.

IPNs or semi-IPNs can include polymers that can comprise as a first phase any of cross-linked and/or thermoplastic polyurethanes, polyureas, polyolefins, copolymers of olefins preferably with acrylates, block copolymers, polyvinyl chloride, natural and synthetic rubbers, as well as silicone rubber, and fluoroelastomers.

The second phase of the IPNs and semi-IPNs of the invention, which is the phase that includes a dye, preferably a fluorescent dye, can be a dispersed phase or a continuous phase. Preferable polymers that can comprise the second phase include acrylates, epoxies, and cyanate esters. Most preferably, the second phase comprises an acrylate polymer with aromatic content.

The advantage of this approach is that dye color retention can be improved while maintaining desired physical properties. Depending on the product application, physical properties may include flexibility, strength, transparency, or thermoformability. This can be achieved through the used of a two-phase IPN or semi-IPN system where the fluorescent dye preferably is reacted into a cross-linked, dispersed second phase in a continuous first phase. Therefore, the continuous first phase dominates the physical properties, and the dispersed second phase serves to anchor the dye and improve photodurability. The advantage lies in the independent optimization of both phases. The first phase can be chosen for a particular physical property while the dispersed second phase can be chosen for enhanced dye photodurability. For instance, accelerated weathering studies have shown that photodurability is improved when the dispersed second phase comprises aromatic components.

Polyurethane that is useful in the present invention includes the reaction product of polyisocyanate, at least one polyol, and at least one curing agent. Any polyisocyanate available to one of ordinary skill in the art is suitable for use according to the invention. Exemplary polyisocyanates include, but are not limited to, 4,4'-diphenylmethane diisocyanate ("MDI"), polymeric MDI, carbodiimide-modified liquid MDI, 4,4'-dicyclohexylmethane diisocyanate ("H112MDI"),p-phenylene diisocyanate ("PPDI"), m-phenylene diisocyanate ("MPDI"), toluene diisocyanate ("TDI"), 3,3'-dimethyl-4,4'-biphenylene diisocyanate ("TODI"), isophoronediisocyanate ("IPDI"), hexamethylene diisocyanate ("HDI"), naphthalene diisocyanate ("NDI"), xylene diisocyanate ("XDI"), p-tetramethylxylene diisocyanate ("p-TMXDI"), m-tetramethylxylene diisocyanate ("m-TMXDI"), ethylene diisocyanate; propylene-1,2-diisocyanate, tetramethylene-1,4-diisocyanate, cyclohexyl diusocyanate, 1,6-hexamethylene-diisocyanate ("HDI"), dodecane-1,12-diisocyanate, cyclobutane-1,3-diisocyanate, cyclohexane-1,3-diisocyanate, cyclohexane-1,4-diisocyanate; 1-isocyanato-3,3,5-trimethyl-5-isocyanatomethylcyclohexane, methyl cyclohexylene diisocyanate, isocyanurate of HDI, triisocyanate of 2,4,4-trimethyl-1,6-hexane diisocyanate ("TMDI"), tetracene diisocyanate, napthalene diisocyanate, anthracene diisocyanate, and mixtures thereof. Polyisocyanates are known to those of ordinary skill in the art as having more than one isocyanate group, e.g., di-, tri-, and tetra-isocyanate. Preferably, the polyisocyanate includes MDI, PPDI, TDI, or a mixture thereof, and more preferably, the polyisocyanate includes MDI. It should be understood that, as used herein, the term "MDI" includes 4,4'-diphenylmethane diisocyanate, polymeric MDI, carbodiimide-modified liquid MDI, and mixtures thereof, and, additionally, that the diisocyanate employed may be "low free monomer," understood by one of ordinary skill in the art to have lower levels of "free" isocyanate monomer, typically less than about 0.1% to about 0.5% free monomer. Examples of "low free monomer" diisocyanates include, but are not limited to Low Free Monomer MDI, Low Free Monomer TDI, Low Free MPDI, and Low Free Monomer PPDI.

The at least one polyisocyanate should have less than about 14% unreacted NCO groups. Preferably, the at least one polyisocyanate has less than about 7.9% NCO, more preferably between about 2.5% and about 7.8%, and most preferably between about 4% to about 6.5%.

Any polyol available to one of ordinary skill in the art is suitable for use according to the invention. Exemplary polyols include, but are not limited to, polyether polyols, hydroxy-terminated polybutadiene and partially/fully hydrogenated derivatives, polyester polyols, polycaprolactone polyols, and polycarbonate polyols. In one preferred embodiment, the

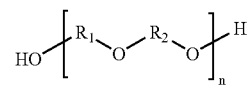

polyol includes polyether polyol, more preferably those polyols that have the generic structure:

where $R_1$ and $R_2$ are straight or branched hydrocarbon chains, each containing from 1 to about 20 carbon atoms, and n ranges from 1 to about 45. Examples include, but are not limited to, polytetramethylene ether glycol, polyethylene propylene glycol, polyoxypropylene glycol, and mixtures thereof. The hydrocarbon chain can have saturated or unsaturated bonds and substituted or unsubstituted aromatic and cyclic groups. Preferably, the polyol of the present invention includes PTMEG.

In another embodiment, polyester polyols are included in the polyurethane material of the invention. Preferred polyester polyols have the generic structure:

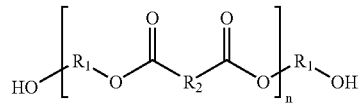

where $R_1$ and $R_2$ are straight or branched hydrocarbon chains, each containing from 1 to about 20 carbon atoms, and n ranges from 1 to about 25. Suitable polyester polyols include, but are not limited to, polyethylene adipate glycol, polybutylene adipate glycol, polyethylene propylene adipate glycol, ortho-phthalate-1,6-hexanediol, and mixtures thereof. The hydrocarbon chain can have saturated or unsaturated bonds, or substituted or unsubstituted aromatic and cyclic groups.

In another embodiment, polycaprolactone polyols are included in the materials of the invention. Preferably, any polycaprolactone polyols have the generic structure:

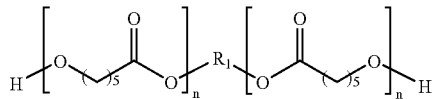

where $R_1$ is a straight chain or branched hydrocarbon chain containing from 1 to about 20 carbon atoms, and n is the chain length and ranges from 1 to about 20. Suitable polycaprolactone polyols include, but are not limited to, 1,6-hexanediol-initiated polycaprolactone, diethylene glycol initiated polycaprolactone, trimethylol propane initiated polycaprolactone, neopentyl glycol initiated polycaprolactone, 1,4-butanediol-initiated polycaprolactone, and mixtures thereof. The hydrocarbon chain can have saturated or unsaturated bonds, or substituted or unsubstituted aromatic and cyclic groups.

In yet another embodiment, the polycarbonate polyols are included in the polyurethane material of the invention. Preferably, any polycarbonate polyols have the generic structure:

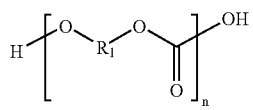

where $R_1$ is predominantly bisphenol A units -(p-$C_6H_4$)—C($CH_3$)$_2$-(p-$C_6H_4$)— or derivatives thereof, and n is the chain length and ranges from 1 to about 20. Suitable polycarbonates include, but are not limited to, polyphthalate carbonate. The hydrocarbon chain can have saturated or unsaturated bonds, or substituted or unsubstituted aromatic and cyclic groups. In one embodiment, the molecular weight of the polyol is from about 200 to about 4000.

Polyamine curatives are also suitable for use in the polyurethane composition of the invention and have been found to improve cut, shear, and impact resistance of the resultant balls. Polyamine curatives are also suitable for use in the polyurethane composition of the invention and have been found to improve cut, shear, and impact resistance of the resultant balls. Preferred polyamine curatives have the general formula:

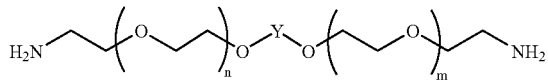

where n and m each separately have values of 0, 1, 2, or 3, and where Y is ortho-cyclohexyl, meta-cyclohexyl, para-cyclohexyl, ortho-phenylene, meta-phenylene, or para-phenylene, or a combination thereof Preferred polyamine curatives include, but are not limited to, 3,5-dimethylthio-2,4-toluenediamine and isomers thereof (tradename ETHACURE 100 and/or ETHACURE 100 LC), 3,5-diethyltoluene-2,4-diamine and isomers thereof, such as 3,5-diethyltoluene-2,6-diamine; 4,4'-bis-(sec-butylamino)-diphenylmethane, 1,4-bis-(sec-butylamino)-benzene, 4,4'-methylene-bis-(2-chloroaniline), 4,4'-methylene-bis-(3-chloro-2,6-diethylaniline), trimethylene glycol-di-p-aminobenzoate, polytetramethyleneoxide-di-p-aminobenzoate, N,N'-dialkyldiamino diphenyl methane; para, para'-methylene dianiline (MDA), m-phenylenediamine (MPDA), 4,4'-methylene-bis-(2-chloroaniline) (MOCA), 4,4'-methylene-bis-(2,6-diethylaniline), 4,4'-diamino-3,3'-diethyl-5,5'-dimethyl diphenylmethane, 2,2', 3,3'-tetrachloro diamino diphenylmethane, 4,4'-methylene-bis-(3-chloro-2,6-diethylaniline), (LONZACURE M-CDEA), trimethylene glycol di-p-aminobenzoate (VERSALINK 740M), and mixtures thereof. Preferably, the curing agent of the present invention includes 3,5-dimethylthio-2,4-toluenediamine and isomers thereof, such as ETHACURE 300, commercially available from Albermarle Corporation of Baton Rouge, La. Suitable polyamine curatives, which include both primary and secondary amines, preferably have molecular weights ranging from about 64 to about 2000. Preferably, n and m, each separately, have values of 1, 2, or 3, and preferably, 1 or 2.

At least one of a diol, triol, tetraol, hydroxy-terminated, may be added to the aforementioned polyurethane composition. Suitable hydroxy-terminated curatives have the following general chemical structure:

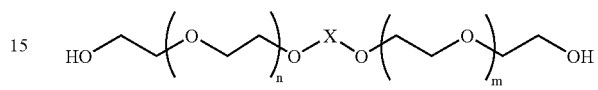

where n and m each separately have values of 0, 1, 2, or 3, and where X is ortho-phenylene, meta-phenylene, para-phenylene, ortho-cyclohexyl, meta-cyclohexyl, or para-cyclohexyl, or mixtures thereof. Preferably, n and m, each separately, have values of 1, 2, or 3, and more preferably, 1 or 2.

Preferred hydroxy-terminated curatives for use in the present invention include at least one of 1,3-bis(2-hydroxyethoxy)benzene and 1,3-bis-[2-(2-hydroxyethoxy)ethoxy] benzene, and 1,3-bis-{2-[2-(2-hydroxyethoxy)ethoxy] ethoxy}benzene, 1,4-butanediol; resorcinol-di-(β-hydroxyethyl)ether, and hydroquinone-di-(β-hydroxyethyl)ether, and mixtures thereof. Preferably, the hydroxy-terminated curatives have molecular weights ranging from about 48 to 2000. It should be understood that molecular weight, as used herein, is the absolute weight average molecular weight and would be understood as such by one of ordinary skill in the art.

Both the hydroxy-terminated and amine curatives can include one or more saturated, unsaturated, aromatic, and cyclic groups. Additionally, the hydroxy-terminated and amine curatives can include one or more halogen groups. Suitable diol, triol, and tetraol groups include ethylene glycol, diethylene glycol, polyethylene glycol, propylene glycol, polypropylene glycol, lower molecular weight polytetramethylene ether glycol, and mixtures thereof. The polyurethane composition can be formed with a blend or mixture of curing agents. If desired, however, the polyurethane composition may be formed with a single curing agent.

The invention is further directed to a golf ball including a translucent outer layer 103 formed from a composition including at least one polyurea formed from a polyurea prepolymer and a curing agent. In one embodiment, the polyurea prepolymer includes at least one diisocyanate and at least one polyether amine.

In this aspect of the invention the diisocyanate is preferably saturated, and can be selected from the group consisting of ethylene diisocyanate, propylene-1,2-diisocyanate, tetramethylene diisocyanate, tetramethylene-1,4-diisocyanate, 1,6-hexamethylene-diisocyanate, octamethylene diisocyanate, decamethylene diisocyanate, 2,2,4-trimethylhexamethylene diisocyanate, 2,4,4-trimethylhexamethylene diisocyanate, dodecane-1,12-diisocyanate, dicyclohexylmethane diisocyanate, cyclobutane-1,3-diisocyanate, cyclohexane-1, 2-diisocyanate, cyclohexane-1,3-diisocyanate, cyclohexane-1,4-diisocyanate, methyl-cyclohexylene diisocyanate, 2,4-methylcyclohexane diisocyanate, 2,6-methylcyclohexane diisocyanate, 4,4'-dicyclohexyl diisocyanate, 2,4'-dicyclohexyl diisocyanate, 1,3,5-cyclohexane triisocyanate, isocyanatomethylcyclohexane isocyanate, 1-isocyanato-3,3,5-trimethyl-5-isocyanatomethylcyclohexane, isocyanatoethylcyclohexane isocyanate, bis(isocyanatomethyl)-cyclohexane diisocyanate, 4,4'-bis(isocyanatomethyl) dicyclohexane, 2,4'-bis(isocyanatomethyl)dicyclohexane, isophoronediisocyanate, triisocyanate of HDI, triisocyanate of 2,2,4-trimethyl-1,6-hexane diisocyanate, 4,4'-dicyclohexylmethane diisocyanate, 2,4-hexahydrotoluene diisocyanate, 2,6-hexahydrotoluene diisocyanate, and mixtures thereof. The saturated diisocyanate is preferably selected from the group consisting of isophoronediisocyanate, 4,4'-dicyclohexylmethane diisocyanate, 1,6-hexamethylene diisocyanate, or a combination thereof.

In another embodiment, the diisocyanate is an aromatic aliphatic isocyanate selected from the group consisting of meta-tetramethylxylene diisocyanate, para-tetramethylxylene diisocyanate, trimerized isocyanurate of polyisocyanate, dimerized uredione of polyisocyanate, modified polyisocyanate, and mixtures thereof.

The polyether amine may be selected from the group consisting of polytetramethylene ether diamines, polyoxypropylene diamines, poly(ethylene oxide capped oxypropylene)ether diamines, triethyleneglycoldiamines, propylene oxide-based triamines, trimethylolpropane-based triamines, glycerin-based triamines, and mixtures thereof. In one embodiment, the polyether amine has a molecular weight of about 1000 to about 3000.

The curing agent may be selected from the group consisting of hydroxy-terminated curing agents, amine-terminated curing agents, and mixtures thereof, and preferably has a molecular weight from about 250 to about 4000.

In one embodiment, the hydroxy-terminated curing agents are selected from the group consisting of ethylene glycol, diethylene glycol, polyethylene glycol, propylene glycol, 2-methyl-1,3-propanediol, 2-methyl-1,4-butanediol, dipropylene glycol, polypropylene glycol, 1,2-butanediol, 1,3-butanediol, 1,4-butanediol, 2,3-butanediol, 2,3-dimethyl-2,3-butanediol, trimethylolpropane, cyclohexyldimethylol, triisopropanolamine, tetra-(2-hydroxypropyl)-ethylene diamine, diethylene glycol di-(aminopropyl)ether, 1,5-pentanediol, 1,6-hexanediol, 1,3-bis-(2-hydroxyethoxy)cyclohexane, 1,4-cyclohexyldimethylol, 1,3-bis-[2-(2-hydroxyethoxy)ethoxy]cyclohexane, 1,3-bis-{2-[2-(2-hydroxyethoxy)ethoxy]ethoxy}cyclohexane, trimethylolpropane, polytetramethylene ether glycol, preferably having a molecular weight from about 250 to about 3900, and mixtures thereof.

The amine-terminated curing agents may be selected from the group consisting of ethylene diamine, hexamethylene diamine, 1-methyl-2,6-cyclohexyl diamine, tetrahydroxypropylene ethylene diamine, 2,2,4- and 2,4,4-trimethyl-1,6-hexanediamine, 4,4'-bis-(sec-butylamino)-dicyclohexylmethane, 1,4-bis-(sec-butylamino)-cyclohexane, 1,2-bis-(sec-butylamino)-cyclohexane, derivatives of 4,4'-bis-(sec-butylamino)-dicyclohexylmethane, 4,4'-dicyclohexylmethane diamine, 1,4-cyclohexane-bis-(methylamine), 1,3-cyclohexane-bis-(methylamine), diethylene glycol di-(aminopropyl)ether, 2-methylpentamethylene-diamine, diaminocyclohexane, diethylene triamine, triethylene tetramine, tetraethylene pentamine, propylene diamine, 1,3-diaminopropane, dimethylamino propylamine, diethylamino propylamine, imido-bis-propylamine, monoethanolamine, diethanolamine, triethanolamine, monoisopropanolamine, diisopropanolamine, isophoronediamine, and mixtures thereof.

In one embodiment, the composition further includes a catalyst that can be selected from the group consisting of a bismuth catalyst, zinc octoate, di-butyltin dilaurate, di-butyltin diacetate, tin(II) chloride, tin(IV) chloride, di-butyltin dimethoxide, dimethyl-bis[1-oxonedecyl)oxy]stannane, di-n-octyltin bis-isooctyl mercaptoacetate, triethylenediamine, triethylamine, tributylamine, oleic acid, acetic acid; delayed catalysts, and mixtures thereof. The catalyst may be present from about 0.005 percent to about 1 percent by weight of the composition.

Any method available to one of ordinary skill in the art may be used to combine the polyisocyanate, polyol or polyamine, and curing agent of the present invention. One commonly employed method, known in the art as a "one-shot method," involves concurrent mixing of the polyisocyanate, polyol, or polyether amine, and curing agent. This method results in a mixture that is inhomogenous (more random) and affords the manufacturer less control over the molecular structure of the resultant composition. A preferred method of mixing is known as the "prepolymer method." In this method, the polyisocyanate and the polyol or polyether amine are mixed separately prior to addition of the curing agent. This method seems to afford a more homogeneous mixture resulting in a more consistent polymer composition.

An optional, filler component may be chosen to adjust the density of the blends described herein, but care should be taken to make sure the optical properties remain as desired. The selection of such filler(s) is dependent upon the type of golf ball desired (i.e., one-piece, two-piece multi-component, or wound), and any filler available to one of ordinary skill in the art is suitable for use according to the invention. Examples of useful fillers include zinc oxide ("ZnO"), barium sulfate, calcium oxide, calcium carbonate, and silica, as well as any salts and oxides thereof. Additional fillers, such as foaming agents, glass and/or plastic microspheres, and various metals, can be added to the polyurethane or polyurea compositions of the present invention, in amounts as needed, for their well-known purposes.

It is also preferred that the composition of the present invention include at least one color stabilizer. Color stabilizers include, but are not limited to, UV absorbers, radical scavengers, such as hindered amine light stabilizers ("HALS"), thermal stabilizers and antioxidants, quenchers, such as nickel quenchers, hydroperoxide decomposers, fillers, and mixtures thereof. It has been determined that fillers, such as ZnO and $TiO_2$, pigments, and paints, have some UV absorbing and/or blocking qualities, and as such, can contribute to the color stability of the composition.

Suitable UV absorbers include, but are not limited to, triazines, benzoxazinones, benzotriazoles, benzophenones, benzoates, formamidines, cinnamates/propenoates, aromatic propanediones, benzimidazoles, cycloaliphatic ketones, formanilides (including oxamides), cyanoacrylates, benzopyranones, salicylates, and mixtures thereof. Without wishing to be bound by any particular theory, it is believed that these compounds absorb harmful UV light and rapidly convert the light into harmless energy, such that the compounds reduce or prevent the rapid degradation of color in many conventional golf balls.

Preferred substituted triazines include those having the formula:

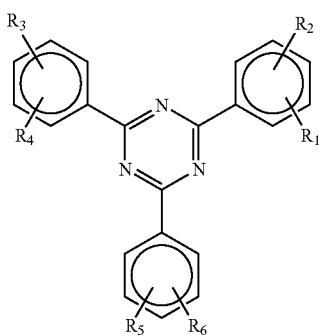

wherein $R_1$ is H, OH, $R_2$ is H, alkoxy, alkylester, hydroxyalkoxy, $R_3$ is alkyl, H, $R_4$ is alkyl, H, alkylester, $R_5$ is alkyl, H, and $R_6$ is alkyl, H, alkylester.

Preferred benzoxazinones include those including the formula:

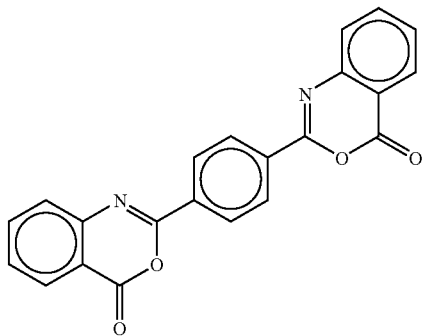

Preferred benzotriazoles include those having the formula:

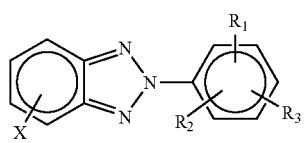

wherein $R_1$ is OH, $R_2$ is alkyl, hydroxyalkyl, acryloxyalkyl, (hydroxyphenyl)alkyl, (alkylester)alkyl, (hydroxyalkylether)oxoalkyl, phenylalkyl, $R_3$ is H, alkyl, and X is Cl, Br, I. Preferably, X is Cl.

Preferred benzophenones include those having the formula:

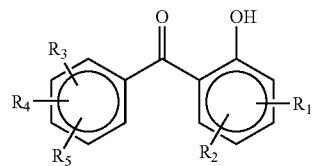

wherein $R_1$ is OH, alkoxy, alkenoic acid alkoxyester, aryloxy, hydroxyalkoxy, hydroxy(alkylether)alkoxy, (polymerized acrylo)alkoxyester, o-alkyl acid ester, $R_2$ is H, $SO_3H$, $SO_3Na$, and $R_3$ is H, OH, $R_4$ is H, alkoxy, OH, and $R_5$ is H, $SO_3Na$.

Preferred benzoates include those having the formula:

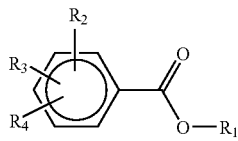

wherein $R_1$ is hydroxyalkylether, alkylphenyl, alkyl, phenyl, hydroxyphenyl, $R_2$ is H, OH, alkyl, hydroxy(alkylether) amino, $R_3$ is H, alkyl, OH, and $R_4$ is H, alkyl.

Preferred formamidines include those having the formula:

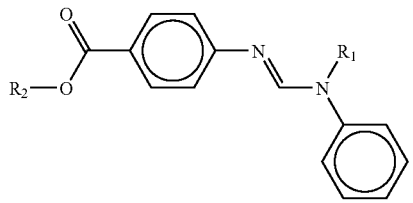

wherein $R_1$ is alkyl and $R_2$ is alkyl.

Preferred cinnamates or propenoates include those having the formula:

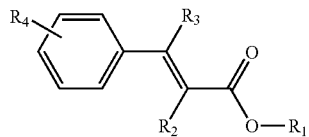

wherein $R_1$ is alkyl; $R_2$ is alkylester, cyano; $R_3$ is H, phenyl; and $R_4$ is H, alkoxy.

Preferred aromatic propanediones include those having the formula:

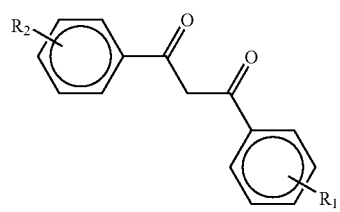

wherein $R_1$ is alkoxy; and R2 is alkyl.

Preferred benzimidazoles include those having the formula:

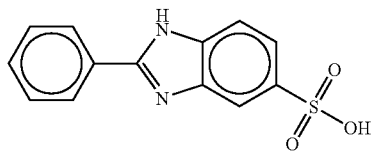

Preferred cycloaliphatic ketones include those having the formula:

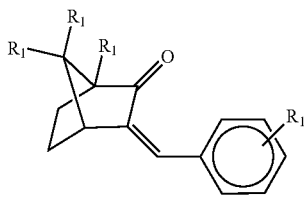

wherein $R_1$ is alkyl.

Preferred formanilides (including oxamides) include those having the formula:

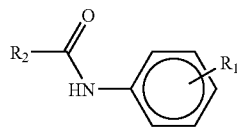

wherein $R_1$ is alkyl, $R_2$ is H, formanilide, alkylalkoxy, and/or contains benzimidazole.

Preferred cyanoacrylates include those having the formula:

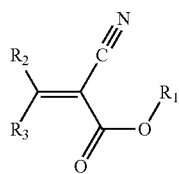

wherein $R_1$ is alkyl, arylcyanoacrylalkyl; $R_2$ is phenyl, H, alkylindoline; and $R_3$ is H, phenyl.

Preferred benzopyranones include those having the formula:

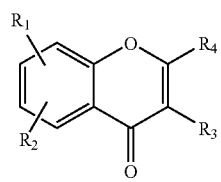

wherein $R_1$; $R_2$; $R_3$; and $R_4$ are OH.

Preferred salicylates include those having the formula:

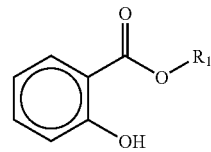

wherein $R_1$ is a linear, cyclic, or branched alkyl group.

The above structures are not intended to be inclusive. One of ordinary skill in the art would be aware that "cross-over" between groups exists, including isomeric structures, and as such, these groups are also suitable in the compositions of the invention.

Suitable aromatic propanedione UV absorbers include, but are not limited to, 4-t-Butyl-4'-methoxydibenzoyl-methane or avobenzone, GIVSORB UV-14; and mixtures thereof.

Suitable benzimidazole UV absorbers include, but are not limited to, 2-Phenyl-1H-benzimidazole-5-sulfonic acid, GIVSORB UV-16; and mixtures thereof.

Suitable benzophenone UV absorbers include, but are not limited to, 2-Hydroxy-4-n-octyloxybenzophenone, UVINUL 3008, 2-Hydroxy-4-methoxybenzophenone, UVINUL 3040, 2-Hydroxy-4-methoxy-5-sulfobenzophenone or Sulisobenzone, UVINUL MS 40, 2-(4-Benzoyl-3-hydroxyphenoxy)-2-propenoic acid ethyl ester, CYASORB UV 2098, Homopolymer of 4-(2-Acryloyloxyethoxy)-2-hydroxybenzophenone, CYASORB UV 2126, 2,2'-Dihydroxy-4-methoxybenzophenone or Dioxybenzone, CYASORB UV 24, 2-Hydroxy-4-(2-hydroxy-3-decyloxypropoxy)benzophenone and 2-Hydroxy-4-(2-hydroxy-3-octyloxypropoxy)benzophenone, MARK 1535, 2,4,4'-Trihydroxybenzophenone, MAXGARD 200, 2-Hydroxy-4-(isooctyloxy)benzophenone, MAXGARD 800, 2-Hydroxy-4-dodecyloxybenzophenone, UVINUL 410, 2,2'-Dihydroxy-4,4'-dimethoxy-5,5'-disulfobenzophenone, disodium salt, UVINUL 3048, 2,4-Dihydroxybenzophenone or 4-Benzoylresorcinol, UVINUL 400, 2,2'-Dihydroxy-4,4'-dimethoxybenzophenone, UVINUL D 49, 2,2',4,4'-Tetrahydroxybenzophenone, UVINUL D 50, 2,2'-Dihydroxy-4-(2-hydroxyethoxy)benzophenone, UVINUL X-19, 2-Hydroxy-4-benzyloxybenzophenone, Seesorb 105, and mixtures thereof.

Suitable benzopyranone WV absorbers include, but are not limited to, 3,3',4',5,7-pentahydroxyflavone or quercetin, and mixtures thereof.

Suitable benzotriazole UV absorbers include, but are not limited to, 2-[2-hydroxy-5-(1,1,3,3-tetramethylbutyl)phenyl]benzotriazole, TINUVIN 329, 2-(2'-hydroxy-5'-(2-hydroxyethyl))benzotriazole, NORBLOC 6000, 2-(2'-hydroxy-5'-methacrylyloxyethylphenyl)-2H-benzotriazole, NORBLOC 7966, 1,1,1-tris(hydroxyphenyl)ethane benzotriazole, THPE BZT, 5-t-butyl-3-(5-chloro-2H-benzotriazol-2-yl)-4-hydroxybenzenepropanoic acid octyl ester and 3-(5-chloro-2H-benzotriazol-2-yl)-5-t-butyl-4-hydroxybenzenepropanoic acid octyl ester, TINUVIN 109, a-[3-[3-(2H-benzotriazol-2-yl)-5-t-butyl-4-hydroxyphenyl]-1-oxopropyl]-w-hydroxypoly(oxy-1,2-ethanediyl) and a-[3-

[3-(2H-benzotriazol-2-yl)-5-t-butyl-4-hydroxyphenyl]-1-oxopropyl]-w-[3-[3-(2H-benzotriazol-2-yl)-5-t-butyl-4-hydroxyphenyl]-1-oxopropoxy]poly(oxy-1,2-ethanediyl), TINUVIN 1130, 2-(2-Hydroxy-3,5-di-t-butylphenyl)benzotriazole, TINUVIN 320, 2-(2-hydroxy-3-t-butyl-5-methylphenyl)-5-chloro-2H-benzotriazole, TINUVIN 326, 2-(3'-5'-di-t-butyl-2'-hydroxyphenyl)-5-chlorobenzotriazole, TINUVIN 327, 2-(2-Hydroxy-3,5-di-t-amylphenyl)benzotriazole, TINUVIN 328, 3-(2H-Benzotriazol-2-yl)-5-t-butyl-4-hydroxybenzenepropanoic acid, TINUVIN 384, 2-(2H-benzotriazol-2-yl)-4-methyl-6-dodecylphenol, TINUVIN 571, 3-(2H-benzotriazol-2-yl)-5-t-butyl-4-hydroxy-1,6-hexanediyl ester of benzenepropanoic acid and 3-(2H-benzotriazol-2-yl)-5-t-butyl-4-hydroxy-methyl ester of benzenepropanoic acid, TINUVIN 840, 2-[2-hydroxy-3,5-bis-(1,1-dimethylbenzyl)phenyl]-2H-benzotriazole, TINUVIN 900, 2-(2H-benzotriazol-2-yl)-6-(1-methyl-1-phenylethyl)-4-(1,1,3,3-tetramethylbutyl)phenol, TINUVIN 928, 3-(2H-benzotriazol-2-yl)-5-t-butyl-4-hydroxybenzenepropanoic acid, C7-9 branched and linear alkyl esters, TINUVIN 99, 2-(2-hydroxy-5-methylphenyl)benzotriazole, TINUVIN P, 2-(2'-hydroxy-3'-sec-butyl-5'-t-butylphenyl) benzotriazole, TINUVIN 350, 2-(2'-hydroxy-5'-t-butylphenyl)benzotriazole, TINUVIN PS, bis[2-hydroxy-3-(2H-benzotriazol-2-yl)-5-octylphenyl]methane, TINUVIN 360, and mixtures thereof.

Suitable benzoate UV absorbers include, but are not limited to, hexadecyl 3,5-di-t-butyl-4-hydroxybenzoate, CYASORB UV 2908, 3-hydroxyphenylbenzoate, SEESORB 300, ethyl-4-[[(ethylphenylamino)methylene]amino]benzoate, GIVSORB UV-1, Phenyl 2-hydroxybenzoate or phenylsalicylate, SEESORB 201, 2,4-di-t-butylphenyl-3,5-di-t-butyl-4-hydroxybenzoate, TINUVIN 120, 4-Bis(polyethoxy)amino acid polyethoxy ethyl ester, UVINUL P 25, 4-t-Butylphenyl 2-hydroxybenzoate or 4-t-butylphenylsalicylate, Seesorb 202, and mixtures thereof.

Suitable benzoxazinone UV absorbers include, but are not limited to, 2,2'-(p-phenylene)di-3,1-benzoxazin-4-one, CYASORB 3638; and mixtures thereof.

Suitable cinnamates or propenoate UV absorbers include, but are not limited to, dimethyl(p-methoxybenzylidene) malonate, SANDUVOR PR 25, 3-(4-methoxyphenyl)-2-propenoic acid 2-ethylhexyl ester or octyl p-methoxycinnamate, UVINUL 3039, and mixtures thereof.

Suitable cyanoacrylate UV absorbers include, but are not limited to, ethyl-2-cyano-3,3-diphenylacrylate, UVINUL 3035, 2-ethylhexyl-2-cyano-3,3-diphenylacrylate, UVINUL 3039, 1,3-bis-[(2'-cyano-3,3'-diphenylacryloyl)oxy]-2,2-bis-{[(2-cyano-3',3'-diphenylacryloyl)oxy]methyl}propane, UVINUL 3030, 2-Cyano-3-(2-methylindolinyl)methylacrylate, UV Absorber Bayer 340, and mixtures thereof.

Suitable cycloaliphatic ketone UV absorbers include, but are not limited to, 3-(4-methylbenzylidene)-D,L-camphor, GIVSORB UV-15, and mixtures thereof.

Suitable formamidine UV absorbers include, but are not limited to, Ethyl-4-[[(methylphenylamino)methylene]amino]benzoate, GIVSORB UV-2, and mixtures thereof.

Suitable formanilide (including oxamide) UV absorbers include, but are not limited to, N-(2-ethoxyphenyl)-N'-(4-isododecylphenyl)oxamide, SANDUVOR 3206, N-[5-t-Butyl-2-ethoxyphenyl)-N'-(2-ethylphenyl)oxamide, TINUVIN 315, N-(2-ethoxyphenyl)-N'-(2-ethylphenyl)oxamide, TINUVIN 312, 2H-benzimidazole-2-carboxylic acid(4-ethoxyphenyl)amide, UVINUL FK 4105, and mixtures thereof.

Suitable triazine UV absorbers include, but are not limited to, 2-[4,6-bis(2,4-dimethylphenyl)-1,3,5-triazin-2-yl]-5-octyloxyphenol, CYASORB UV 1164, confidential triazine derivative, TINUVIN 1545, 2-(4,6-diphenyl-1,3,5-triazin-2-yl)-5-hexyloxyphenol, TINUVIN 1577 FF, 2-[4-((2-Hydroxy-3-dodecyloxypropyl)oxy)-2-hydroxyphenyl]-4,6-bis(2,4-dimethylphenyl)-1,3,5-triazine, TINUVIN 400, 2,4,6-Trianilino-p-(carbo-2'-ethylhexyl-1'-oxy)-1,3,5-triazine, UVINUL T-150, and mixtures thereof.

Suitable salicylate UV absorbers include, but are not limited to, 3,3,5-trimetylcyclohexylsalicylate or homomentyylsalicylate, NEO HELIOPAN HMS, menthyl-o-aminobenzoate, NEO HELIOPAN MA, and mixtures thereof.

The TINUVIN compounds are commercially available from Ciba Specialty Chemicals Corporation of Tarrytown, N.Y., UVINULS are commercially available from BASF Corporation of Charlotte, N.C., CYASORBS are commercially available from Cytec Industries Inc. of West Paterson, N.J., SANDUVORS are commercially available from Clariant Corporation of Charlotte, N.C., NORBLOCS are commercially available from Janssen Pharmaceutica of Titusville, N.J., Quercetin is commercially available from ACROS Organics of Pittsburgh, Pa., MAXGARDS are commercially available from Garrison Industries of El Dorado, Ariz., SEESORBS are commercially available from Shipro Kasei of Osaka, Japan, MARK compounds are commercially available from Witco Chemical of Oakland, N.J., GIVSORBS are commercially available from Givauden-Roure Corp. of Geneva, Switzerland, and NEO HELIOPANS are commercially available from Haarmann & Reimer of Teterboro, N.J.

Other suitable UV absorbers include inorganic pigments such as titanium dioxide, zinc oxide, barium sulfate, violet, PALIOGEN Blue L 6385, ultra marine blue, and other blue pigments, and mixtures thereof.

In a particularly preferred embodiment, the at least one UV absorber is a liquid. Preferably, the UV absorber is a liquid when the UV absorber is present in an amount greater than about 1% of the total polyurethane or polyurea composition. Suitable liquid UV absorbers include, but are not limited to, UVINUL 3039, 2-ethylhexyl p-methoxycinnamate, NEO HELIOPAN AV, UVINUL P25, isoamyl p-methoxycinnamate, NEO HELIOPAN E1000, 2-ethylhexylsalicylate, NEO HELIOPAN OS, 3,3,5-trimetylcyclohexylsalicylate or homomentyylsalicylate, NEO HELIOPAN HMS, menthyl-o-aminobenzoate, NEO HELIOPAN MA, TINUVIN 99, TINUVIN 384, TINUVIN 213, TINUVIN 1130, TINUVIN 109, TINUVIN 400, TINUVIN 571, SANDUVOR 3206, MAXGARD 800, MARK 1535, GIVSORB UV-1, or mixtures thereof.

In a preferred embodiment, the selected UV absorber has an extinction coefficient, $\epsilon$, of greater than about 10,000 L·mol-1·cm-1 at any wavelength between about 290 nm and about 350 nm. More preferably, the selected UV absorber has an $\epsilon$ of between about 10,000 L·mol-1·cm-1 and about 30,000 L·mol-1·cm-1 at wavelengths between about 290 nm and about 350 nm, and most preferably, between about 10,000 L·mol1·cm-1 and about 20,000 L·mol-1·cm-1 at wavelengths between about 290 nm and about 350 nm. It is believed that spectrally matching the peak absorbance of the UV absorber to that of the polymer composition provides the most ideal color and light stabilization. For example, UV absorbers that have an absorbance maximum at wavelengths higher than the composition have been found to be less effective than those that absorb at wavelengths that more closely match the absorbance of the polymer, even if the amplitude of the absorbance is lower. Moreover, the refractive indices of the UV absorber should closely match that of the polymer to maintain the translucent properties. The indices are preferably within 0.2 of each other, and more preferably within 0.05 of each other.

Preferably, the UV absorbers have certain local absorption maxima between about 280 nm and about 400 nm, as measured in a dilute solution of a non-hydrogen-bonding solvent, such as chloroform or methylene chloride. The UV absorbers may have a single local maximum between about 300 nm to about 360 nm, more preferably between about 315 nm to about 340 nm. Example include, but are not limited to, SANDUVOR VSU, UVINUL 3030, SANDUVOR PR 25, GIVSORB UV-15, and mixtures thereof. Most preferably, the UV absorbers have two local absorption maxima, the first being in the region between about 285 nm and about 315 nm, and the second being in the region between about 320 nm and about 370 nm. Examples of these include, but are not limited to, TINUVIN 328, NORBLOC 6000, NORBLOC 7966, CYASORB 2337, TINUVIN P, GIVSORB UV-13, CYASORB 3638, UVINUL D50, CYASORB UV 24, and mixtures thereof.

Without wishing to be bound by any particular theory, it is believed that radical scavengers, such as hindered amine light stabilizers, function primarily as free radical scavengers. Commercially available examples include, but are not limited to, bis-(1-octyloxy-2,2,6,6-tetramethyl-4-piperidinyl)sebacate, TINUVIN 123, n-butyl-(3,5-di-t-butyl-4-hydroxybenzyl)bis-(1,2,2,6-pentamethyl-4-piperidinyl)malonate, TINUVIN 144, TINUVIN 292, TINUVIN 400, dimethyl succinate with 4-hydroxy-2,2,6,6-tetramethyl-1-piperidineethanol, TINUVIN 622, bis(1,2,2,6,6-pentamethyl-4-piperidinyl)sebacate, bis-(1,2,2,6,6-pentamethyl-4-piperidinyl)sebacate, TINUVIN 765, and bis-(2,2,6,6-tetramethyl-4-piperidinyl)sebacate, TINUVIN 770 from Ciba Specialty Chemicals Corporation, dimethyl succinate with 4-hydroxy-2,2,6,6-tetramethyl-1-piperidineethanol, CHIMASSORB 119, poly{[6-(1,1,3,3-tetramethyl(butyl)amino]-s-triazine-2,4-diyl}[(2,2,6,6-tetramethyl-4-piperidyl)imino]hexamethylene[(2,2,6,6-tetramethyl-4-piperidyl)imino], CHIMASSORB 944, and 1,6-hexanediamine, N,N'-bis-(2,2,6,6-tetramethyl-4-piperidinyl), CHIMASSORB 2020, also from Ciba Specialty Chemicals Corporation, CYNASORB UV-3581 from Cytec Industries Inc, SANDUVOR 3070 from Clariant Corporation of Charlotte, N.C., UVINULS 4049 H and 4050 H from BASF Corporation, bis-(substituted)heteropolycyclicdione, UVINUL 4049 H, N,N'-1,6-hexanediylbis{N-(2,2,6,6-tetramethyl-4-piperidinyl)-formamide}, UVINUL 4050 H, dimethyl succinate polymer with 4-hydroxy-2,2,6,6-tetra-methyl-1-piperidine ethanol, TINUVIN 622LD, hindered amine, SANDUVOR 3070, 3-dodecyl-1-(2,2,6,6-tetramethyl-4-piperidyl-pyrrolidin-2,5-dione, CYASORB UV-3581, polymethylpropyl-3-oxy-[4(2,2,6,6-tetramethyl)piperidinyl]siloxane, bis-(1,2,2,6,6-pentamethyl-4-piperidinyl)-sebacate, bis-(2,2,6,6-tetramethyl-4-piperidinyl)-sebacate, bis-(1-octyloxy-2,2,6,6,tetramethyl-4-piperidinyl)sebacate, n-butyl-(3,5-di-t-butyl-4-hydroxybenzyl)bis-(1,2,2,6-pentamethyl-4-piperidinyl)malonate, bis(2,2,6,6-tetramethyl-4-piperidinyl)sebacate, and mixtures thereof.

Examples of other suitable HALS typically include, but are not limited to, those containing at least one of the following structure:

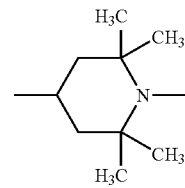

It is believed that thermal stabilizers and antioxidants protect polymers against thermo-oxidative degradation. Some stabilizers include, but not limited to, IRGANOX 245, IRGANOX 1010, IRGANOX 1076, IRGANOX 1135, IRGANOX 5057, and IRGANOX MD 1024 from Ciba Specialty Chemicals Corporation, CYANOXS 790 and 1791 from Cytec Industries Inc, SANDOSTAB P-EPQ from Clariant Corporation, UVINULS 2003 AO and 2012 AO from BASF Corporation, tris(mono-nonylphenyl)phosphite, UVINUL 2003 AO, 1-glyceryl oleate and DL-alpha-tocopherol, UVINUL 2012 AO, triethyleneglycol bis-93-(3'-t-butyl-4'-hydroxy-5'-methyl-phenyl)-propionate, IRGANOX 245, tetrakis[3,5-di-t-butylhydroxyhydro-cinnamate)]-methane, IRGANOX 1010, 3,5-di-t-4-hydroxy-hydrocinnamic acid and $C_{7-9}$-branched alkyl esters, IRGANOX 1135, aryl phosphonite, SANDOSTAB P-EPQ, tris(mono-nonylphenyl)phosphite, NAUGARD P, and mixtures thereof.

Also suitable as antioxidants are many hindered phenols, such as 2,6-di-t-butyl-4-methyl-phenol, 2,6-di-t-butyl-4-nonyl-phenol, 2,2'-methylene-bis-(4-methyl-6-t-butyl-phenol), 4,4'-butylidene-bis-(2-t-butyl-5-methyl-phenol), 4,4'-thio-bis-(2-t-butyl-5-methyl-phenol), 2,2'-thio-bis(6-t-butyl-4-methyl-phenol), 2,5-di-t-amyl-hydroquinone, polymeric sterically hindered phenol, octadecyl-3-(3',5'-di-t-butyl-4'-hydroxyphenyl)propionate, tetrakismethylene(3,5-di-t-butyl-4-hydroxyhydrocinnamate)methane, tris(3,5-di-t-butyl-4-hydroxybenzyl)isocyanurate, 2,2'-thiodiethyl bis-(3,5-di-t-butyl-4-hydroxyphenyl)propionate, 1,1,3-tris-(2'-methyl-4'-hydroxy-5'-t-butyl-phenyl)-butane, 2,2'-methylene-bis-6-(1-methyl-cyclohexyl)-papa-cresol, 2,4-dimethyl-6-(1-methyl-cyclohexyl)-phenol, N,N'-hexamethylene bis-(3,5-di-t-butyl-4-hydroxy-hydrocinnamamide), octadecyl-3,5-di-t-butyl-4-hydroxyhydrocinnamate, N-phenylbenzeneamine, reaction products with 2,4,4-trimethylpentene, and mixtures thereof.

Other suitable antioxidants include hindered phenols with the generic structure:

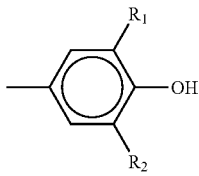

wherein $R_1$ and $R_2$ are t-butyl groups, alkyl groups, or oxyalkylenes; phosphites with the generic structure:

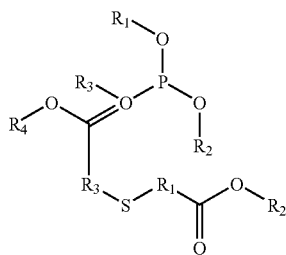

wherein $R_1$, $R_2$, and $R_3$ are alkyl groups or phenyl groups, thioesters having the generic structure:
   wherein $R_1$, $R_2$, $R_3$, and $R_4$ are alkyl groups, and mixtures thereof.

Phosphites, such as tris-(2,4-di-t-butyl-phenyl)phosphite, tris-(2,4-di-t-butyl-phenyl)phosphite plus distearyl-3,3-thio-dipropionate (about 3% on phosphite), bis-(2,4-di-t-butyl-phenyl)pentaerylthritol-diphosphite, tetrakis-(2,4-di-t-butyl-phenyl)4,4'-biphenylene-diphosphonite, tris-(p-nonylphenyl)phosphite, diisodecyl-phenyl-phosphite, diphenyl-isodecyl-phosphite, triisodecyl-phosphite, trilauryl-phosphite, and mixtures thereof, are also suitable antioxidants. Similarly, many thioesters, such as di-lauryl-3,3'-thio-dipropionate, di-stearyl-3,3'-thio-dipropionate, and mixtures thereof could be used as an antioxident.

Quenchers are light stabilizers able to take over the energy absorbed by the chromophores present in a plastic material and to dispose of it efficiently to prevent degradation. The energy can be dissipated either as heat or as fluorescent or phosphorescent radiation. For energy transfer to occur from an excited chromophore to the quencher, the latter must have lower energy states than the donor. Without wishing to be bound by any particular theory, it is believed that the transfer can proceed according to two general mechanisms. The first process, the long range energy transfer or Forester mechanism, is based on a dipole-dipole interaction and is usually observed in the quenching of excited singlet states. The distance between chromophore and quencher may be as large as 5 or 10 nm, provided there is a strong overlap between the emission spectrum of the chromophore and the absorption spectrum of the quencher. The Forester mechanism has been considered as a possible stabilization mechanism by typical UV absorbers with extinction coefficients greater than 10,000 L·mol-1·cm-1. Though quenching of carbonyl compounds through this mechanism has been postulated several times it has not been shown unequivocally.

The second type of process quenchers may operate with is the so-called contact, or collisional, or exchange energy transfer. For an efficient transfer to take place, the distance between quencher and chromophore should not exceed about 1.5 nm. This means that the stabilization that can be achieved will depend on the concentration of the quencher and on the lifetime of the excited donor. Considering the longer lifetimes of excited triplet states compared to those of singlet states, energy transfer from triplet states is more likely.

Suitable quenchers include, but are not limited to, nickel dibutyldithiocarbamate; thio bis 2,2'-[4-(1,1,3,3-tetramethylbutyl)-phenyl]nickel-2-ethyl hexanoate; n-butylamine-nickel-2,2'-thio bis(4-t-octylphenolate); nickel-bis-[2,2'-thio bis(4-t-octylphenolate)]; and mixtures thereof, all commercially available from Ciba Corporation.

In another embodiment of the present invention, the polyurethane or polyurea cover compositions can include in situ UV absorbers. In this embodiment, these "reactive" UV stabilizers are chemically bound directly to the polymer backbone, usually to one of the prepolymer components. Without being bound by theory, it is believed that attaching the stabilizers in this manner prevents migration of the stabilizers out of the polymer, and therefore increases the length of time for which color stabilization is provided to the composition. Preferred in situ UV absorbers include, but are not limited to, piperidine-based compounds.

The at least one UV stabilizer should be present in an amount between about 0.1 weight percent and about 6.0 weight percent, more preferably between about 1.0 weight percent to about 5.0 weight percent, and most preferably, between about 3.0 weight percent and about 5.0 weight percent. The HALS, if present, is preferably present in an amount between about 0.01 weight percent and about 3 weight percent, more preferably, between about 0.05 weight percent and about 2 weight percent, and most preferably, between about 0.1 weight percent and about 1 weight percent.

In a preferred embodiment, a color stabilizer package comprises at least one UV absorber and at least one HALS. Preferably, the ratio of UV absorber to HALS is between about 1:1 to about 100:1, more preferably between about 7:1 to about 70:1, and most preferably, between about 30:1 to about 60:1.

In an alternative embodiment, the polyurethane or polyurea composition comprises at least one UV absorber and at least one HALS. Preferably, the ratio of UV absorber to HALS is between about 1:1 to about 50:1, more preferably between about 7:1 to about 50:1, and most preferably, between about 30:1 to about 50:1.

It is noted that the illustrated nozzle 1 contains three passageways therethrough, which conveniently match up with the three passageways in a known hot runner manifold. See U.S. Pat. No. 5,783,293, which is incorporated herein by reference in its entirety. However, one skilled in the art can appreciate that fewer or more passageways can be provided. Indeed, one skilled in the art can appreciate that nozzle 1 can be scaled to produce a part having just one or many layers.

While the preferred embodiments of the present invention have been described above, it should be understood that they have been presented by way of example only, and not of limitation. It will be apparent to persons skilled in the relevant art that various changes in form and detail can be made therein without departing from the spirit and scope of the invention. Thus the present invention should not be limited by the above-described exemplary embodiments, but should be defined only in accordance with the following claims and their equivalents.

What is claimed is:

1. A nozzle for an injection molding machine, comprising:
a nozzle body having first and second passageways therethrough, a counter bore defining an inner wall and a ledge, a portion of said inner wall being threaded, and an annular groove in said counter bore ledge, said annular groove being in fluid communication with said nozzle body second passageway;
an inner nozzle having a first end and having an orifice at a second end, said inner nozzle having a passageway therethrough in fluid communication with said nozzle body first passageway; and
an outer nozzle removably and fixedly coupled to said nozzle body at a first end and having an orifice at a second end, said outer nozzle having a passageway therethrough in fluid communication with said nozzle body second passageway, said inner nozzle being positioned within said outer nozzle passageway.

2. The nozzle of claim 1, wherein said annular groove has a hemispherical shape.

3. The nozzle of claim 1, wherein said outer nozzle further includes:
a wall having a threaded portion to matingly engage said nozzle body inner wall threaded portion; and
an annular groove on an inner end of said outer nozzle wall positioned to matingly engage said nozzle body annular groove to provide fluid communication between said nozzle body second passageway and an inner surface of said outer nozzle wall.

4. The nozzle of claim 3, wherein said outer nozzle annular groove has a hemispherical shape.

5. The nozzle of claim 3, wherein:
said outer nozzle further includes a ledge in said inner surface of said outer nozzle wall; and
said inner nozzle further includes a wall having a ledge on an outer surface of said inner nozzle wall, said inner nozzle ledge configured to matingly engage said outer nozzle ledge.

6. The nozzle of claim 5, wherein said inner and outer nozzles are configured such that when said inner nozzle ledge is matingly engaged with said outer nozzle ledge and said outer wall threaded portion is matingly engaged with said nozzle body inner wall threaded portion, said inner nozzle is retained such that said inner nozzle passageway is in fluid communication with said nozzle body first passageway and said outer nozzle passageway is in fluid communication with said nozzle body second passageway.

7. The nozzle of claim 6, wherein said nozzle body, said inner nozzle, and said outer nozzle are all substantially concentric.

8. The nozzle of claim 1, wherein:
said inner nozzle orifice and said outer nozzle orifice are substantially concentric and substantially coplanar; and
said outer nozzle orifice substantially surrounds said inner nozzle orifice.

9. The nozzle of claim 8, wherein said inner nozzle orifice has a diameter of approximately 0.020 inch to approximately 0.150 inch.

10. The nozzle of claim 9, wherein said outer nozzle orifice has a diameter of approximately 0.050 inch to approximately 0.250 inch.

11. The nozzle of claim 1, wherein a ratio of a diameter of said outer nozzle to a diameter of said inner nozzle is from approximately 1:1 to approximately 10:1.

12. The nozzle of claim 11, wherein said ratio is less than approximately 5:1.

13. The nozzle of claim 11, wherein said ratio is less than approximately 3:1.

14. The nozzle of claim 1, wherein:
said inner nozzle orifice and said outer nozzle orifice are substantially concentric and not substantially coplanar; and
said outer nozzle orifice substantially surrounds said inner nozzle orifice.

15. The nozzle of claim 1, wherein:
said inner nozzle further includes a wall having an inner surface and an outer surface;
said inner surface defines said inner nozzle passageway; and
said outer surface has a plurality of radial grooves, said radial grooves being in fluid communication with said nozzle body second passageway.

16. A nozzle for an injection molding machine, comprising:
a nozzle body having first and second passageways therethrough;
an inner nozzle having a first end and having an orifice at a second end, said inner nozzle having a passageway therethrough in fluid communication with said nozzle body first passageway; and
an outer nozzle removably and fixedly coupled to said nozzle body at a first end and having an orifice at a second end, said outer nozzle having a passageway therethrough in fluid communication with said nozzle body second passageway, said inner nozzle being positioned within said outer nozzle passageway; wherein:
said inner nozzle further includes a wall having an inner surface and an outer surface;
said inner surface defines said inner nozzle passageway;
said outer surface has a plurality of radial grooves, said radial grooves being in fluid communication with said nozzle body second passageway;
said radial grooves extend from said inner nozzle first end to an alignment diameter of said inner nozzle;
said inner nozzle further includes an annular groove between said alignment diameter and said inner nozzle orifice; and
said inner nozzle further includes a plurality of outer passageways providing fluid communication between said radial grooves and said inner nozzle annular groove.

17. The nozzle of claim 16, wherein:
said inner nozzle further includes a tapered section between said inner nozzle annular groove and said inner nozzle second end; and
an end of said tapered section and said outer nozzle defines said outer nozzle orifice, said outer nozzle orifice being annular.

18. The nozzle of claim 17, wherein said inner nozzle further includes a section having a substantially uniform diameter between said inner nozzle annular groove and said tapered section.

* * * * *